(12) United States Patent
Moon et al.

(10) Patent No.: US 7,283,509 B2
(45) Date of Patent: Oct. 16, 2007

(54) APPARATUS AND METHOD FOR RETRANSMITTING HIGH-SPEED DATA IN A CDMA MOBILE COMMUNICATION SYSTEM

(75) Inventors: Yong-Suk Moon, Songnam-shi (KR); Gin-Kyu Choi, Seoul (KR); Hun-Kee Kim, Seoul (KR); Jae-Seung Yoon, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 1139 days.

(21) Appl. No.: 10/202,963

(22) Filed: Jul. 25, 2002

(65) Prior Publication Data

US 2003/0021240 A1    Jan. 30, 2003

(30) Foreign Application Priority Data

Jul. 25, 2001    (KR)    .............................. 2001-44842

(51) Int. Cl.
    *H04B 7/216*    (2006.01)
(52) U.S. Cl. ...................................... 370/342; 370/441
(58) Field of Classification Search ...................... None
    See application file for complete search history.

(56) References Cited

U.S. PATENT DOCUMENTS

| | | | | |
|---|---|---|---|---|
| 6,005,855 A | * | 12/1999 | Zehavi et al. | ................ 370/335 |
| 6,052,565 A | * | 4/2000 | Ishikura et al. | ........... 455/67.11 |
| 6,272,123 B1 | * | 8/2001 | Abe | ........................... 370/342 |
| 6,545,989 B1 | * | 4/2003 | Butler | ........................ 370/329 |
| 6,657,977 B1 | * | 12/2003 | Norman et al. | ............. 370/305 |
| 6,674,807 B1 | * | 1/2004 | Park et al. | .................. 375/265 |
| 6,768,728 B1 | * | 7/2004 | Kim et al. | .................. 370/342 |

OTHER PUBLICATIONS

Australian Examiner's First Report dated Sep. 3, 2003 issued in a counterpart application, namely, Appln. No. 2002300260.
"Adaptive HARQ For Fixed TTI Using Soft Acknowledgement", SIEMENS, TSG-RAN Working Group 1 Meeting #20 TSGR1#20(01)0518(online), May 21-25, 2001.
Kojima et al., "Performance of Selective Repeat ARQ Scheme Using An Adaptive Modulation System", The Institute of Electronics, Information and Communication Engineers, May 1996, pp. 13-18.
Panasonic: "Proposal of Bit Mapping for Type-III HARQ", TSG-RAN Working Group 1 Meeting #18, Jan. 15-18, 2001, pp. 1-7.
Chan et al., An Adaptive Hybrid FEC/ARQ Protocol Using Turbo Codes, 1997 IEEE.
Banerjee et al., Performance of Hybrid ARQ Schemes Using Turbo Trellis Coded Modulation For Wireless Channels, 2000 IEEE.

* cited by examiner

*Primary Examiner*—Phirin Sam
(74) *Attorney, Agent, or Firm*—The Farrell Law Firm, P.C.

(57) ABSTRACT

An apparatus for retransmitting data at a retransmission request from a receiver by a transmitter in a CDMA mobile communication system including a turbo encoder with a given coding rate and initially transmitting systematic bits and parity bits obtained by encoding the data by the turbo encoder using one modulation mode among a plurality of modulation modes. A controller determines a modulation mode to be used between the transmitter and the receiver in response to the retransmission request. A distributor distributes coded bits obtained by encoding the data at the coding rate into systematic bits and parity bits. A selector selects coded bits transmittable by the determined modulation mode among the systematic bits and the parity bits at the initial transmission, if the determined modulation mode is different from the modulation mode used at initial transmission. A modulator modulates the transmittable coded bits into modulated symbols according to the determined modulation mode.

30 Claims, 13 Drawing Sheets

APPARATUS AND METHOD FOR RETRANSMITTING HIGH-SPEED DATA IN A CDMA MOBILE COMMUNICATION SYSTEM

PRIORITY

This application claims priority to an application entitled "Apparatus and Method for Retransmitting High-Speed Data in a CDMA Mobile Communication System" filed in the Korean Industrial Property Office on Jul. 25, 2001 and assigned Serial No. 2001-44842, the contents of which are incorporated herein by reference.

BACKGROUND OF THE INVENTION

1. Field of the Invention

The present invention relates generally to a data transmission/reception apparatus and method in a CDMA (Code Division Multiple Access) mobile communication system, and in particular, to an apparatus and method for transmitting/receiving data using a variable modulation mode at retransmission.

2. Description of the Related Art

Currently, the mobile communication system has evolved from an early voice-based communication system into a high-speed, high-quality radio data packet communication system for providing a data service and a multimedia service. In addition, a $3^{rd}$ generation mobile communication system, divided into an asynchronous 3GPP ($3^{rd}$ Generation Partnership Project) system and a synchronous 3GPP2 ($3^{rd}$ Generation Partnership Project 2) system, is being standardized for a high-speed, high quality radio data packet service. For example, standardization on HSDPA (High-Speed Downlink Packet Access) is performed by the 3GPP, while standardization on 1xEV-DV is performed by the 3GPP2. Such standardizations are carried out to find out a solution for a high-speed, high-quality radio data packet transmission service of 2 Mbps or over in the $3^{rd}$ generation mobile communication system. A $4^{th}$ generation mobile communication system is proposed to provide a high-speed, high-quality multimedia service superior to that of the $3^{rd}$ generation mobile communication system.

A principal factor of impeding the high-speed, high-quality radio data service lies in the radio channel environment. The radio channel environment is frequently changed due to a variation in signal power caused by white nose and fading, shadowing, Doppler effect caused by a movement of and a frequent change in speed of a UE (User Equipment), and interference caused by other users and a multipath signal. Therefore, in order to provide the high-speed radio data packet service, there is a need for an improved technology capable of increasing adaptability to the variation in the channel environment in addition to the general technology provided for the existing $2^{nd}$ or $3^{rd}$ generation mobile communication system. A high-speed power control method used in the existing system also increases adaptability to the variation in the channel environment. However, both the 3GPP and the 3GPP2, carrying out standardization on the high-speed data packet transmission, make reference to AMCS (Adaptive Modulation/Coding Scheme) and HARQ (Hybrid Automatic Repeat Request).

The AMCS is a technique for adaptively changing a modulation mode and a coding rate of a channel encoder according to a variation in the downlink channel environment. Commonly, to detect the downlink channel environment, a UE measures a signal-to-noise ratio (SNR) and transmits the SNR information to a Node B over an uplink. The Node B predicts the downlink channel environment based on the SNR information, and designates proper modulation mode and coding rate according to the predicted value. The modulations available for the AMCS include QPSK (Quadrature Phase Shift Keying), 8PSK (8-ary Phase Shift Keying), 16 QAM (16-ary Quadrature Amplitude Modulation) and 64 QAM (64-ary Quadrature Amplitude Modulation), and the coding rates available for the AMCS include 1/2 and 3/4. Therefore, an AMCS system applies the high-order modulations (16 QAM and 64 QAM) and the high coding rate 3/4 to the UE located in the vicinity of the Node B, having a good channel environment, and applies the low-order modulations (QPSK and 8 PSK) and the low coding rate 1/2 to the UE located in a cell boundary. In addition, compared with the existing high-speed power control method, the AMCS decreases an interference signal, thereby improving the average system performance.

The HARQ is a link control technique for correcting an error by retransmitting the transmitted data upon occurrence of a packet error at initial transmission. Generally, the HARQ is classified into Chase Combining (CC), Full Incremental Redundancy (FIR), and Partial Incremental Redundancy (PIR).

The CC is a technique for transmitting a packet such that the whole packet transmitted at retransmission is equal to the packet transmitted at initial transmission. In this technique, a receiver combines the retransmitted packet with the initially transmitted packet previously stored in a buffer thereof by a predetermined method. By doing so, it is possible to increase reliability of coded bits input to a decoder, thus resulting in an increase in the system performance. Combining the two same packets is similar to repeated coding in terms of effects, so it is possible to increase a performance gain by about 3 dB on the average.

The FIR is a technique for transmitting a packet comprised of only the redundant bits generated from the channel encoder instead of the same packet, thus to improve performance of a decoder in the receiver. That is, the FIR uses the new redundant bits as well as the initially transmitted information resulting in a decrease in the coding rate, thereby improving performance of the decoder. It is well known in coding theory that a performance gain by a low coding rate is higher than a performance gain by repeated coding. Therefore, the FIR is superior to the CC in terms of only the coding gain.

Unlike the FIR, the PIR is a technique for transmitting a combined data packet of the information bits and the new redundant bits at retransmission. Therefore, the PIR can obtain the similar effect to the CC by combining the retransmitted information bits with the initially transmitted information bits during decoding, and also obtain the similar effect to the FIR by performing the decoding using the redundant bits. The PIR has a coding rate slightly higher than that of the FIR, showing average performance between the FIR and the CC. However, the HARQ should be considered in the light of not only the performance but also the system complexity, such as a buffer size and signaling of the receiver, so it is not easy to determine only one of them.

The AMCS and the HARQ are separate techniques for increasing adaptability to the variation in the link environment. Preferably, it is possible to remarkably improve the system performance by combining the two techniques. That is, the transmitter determines a modulation mode and a coding rate that is proper for a downlink channel condition by the AMCS, and then transmits packet data according to the determined modulation mode and coding rate, and the receiver sends a retransmission request upon failure to decode the data packet transmitted by the transmitter. Upon receipt of the retransmission request from the receiver, the Node B retransmits the data packet by the HARQ.

FIG. 1 illustrates an existing transmitter for high-speed packet data transmission, wherein it is possible to realize various AMCSs and HARQs by controlling a channel encoder 112. Referring to FIG. 1, the channel encoder 112 is comprised of an encoder and a puncturer. When input data that is proper to a data rate is applied to an input terminal of the channel encoder 112, the encoder performs encoding in order to decrease a transmission error rate. Further, the puncturer punctures an output of the encoder according to a coding rate and an HARQ type previously determined by a controller 120, and provides its output to a channel interleaver 114. Since the future mobile communication system needs a powerful channel coding technique in order to reliably transmit high-speed multimedia data, the channel encoder of FIG. 1 is realized by a turbo encoder 200 with a mother coding rate R=⅙ and a puncturer 216, as illustrated in FIG. 2. It is known that channel coding by the turbo encoder 200 shows performance closest to the Shannon limit in terms of a bit error rate (BER) even at a low SNR. The channel coding by the turbo encoder 200 is also adopted for the HSDPA and 1xEV-DV standardization by the 3GPP and the 3GPP2. The output of the turbo encoder 200 can be divided into systematic bits and parity bits. The "systematic bits" refer to actual information bits to be transmitted, while the "parity bits" refer to bits used to help a receiver correct a possible transmission error. The puncturer 216 selectively punctures the systematic bits or the parity bits output from the encoder 200, thus to satisfy a determined coding rate.

Referring to FIG. 2, upon receiving one transmission frame, the channel encoder outputs the intact transmission frame as a systematic bit frame X. The transmission frame is also provided to a first channel encoder 210, and the first channel encoder 210 performs coding on the transmission frame and outputs two different parity bit frames $Y_1$ and $Y_2$. In addition, the transmission frame is also provided to an interleaver 212, and the interleaver 212 interleaves the transmission frame. The intact interleaved transmission frame is transmitted as an interleaved systematic bit frame X'. The interleaved transmission frame is provided to a second channel encoder 214, and the second channel encoder 214 performs coding on the interleaved transmission frame and outputs two different parity bit frames $Z_1$ and $Z_2$. The systematic bit frames X and X' and the parity bit frames $Y_1$, $Y_2$, $Z_1$ and $Z_2$ are provided to the puncturer 216 in a transmission unit of 1, 2, . . . , N. The puncturer 216 determines a puncturing pattern according to a control signal provided from the controller 120 of FIG. 1, and performs puncturing on the systematic bit frame X, the interleaved systematic bit frame X', and the four different parity bit frames $Y_1$, $Y_2$, $Z_1$ and $Z_2$ using the determined puncturing pattern, thus outputting desired systematic bits S and parity bits P.

As described above, the puncturing pattern used to puncture the coded bits by the puncturer 216 depends upon the coding rate and the HARQ type. That is, in the case of the CC, it is possible to transmit the same packet at each transmission by puncturing the coded bits such that the puncturer 216 has a fixed combination of the systematic bits and the parity bits according to a given coding rate. For the FIR and PIR, the puncturer 216 punctures the coded bits in a combination of the systematic bits and the parity bits according to the given coding rate at initial transmission, and punctures the coded symbols in a combination of various parity bits at each retransmission, thus resulting in a decrease in the overall coding rate. For example, in the case of the CC with the coding rate 1/2, the puncturer 216 can continuously output the same bits X and $Y_1$ for one input bit at initial transmission and retransmission, by fixedly using [1 1 0 0 0 0] in the order of the coded bits [X $Y_1$ $Y_2$ X' $Z_1$ $Z_2$] as the puncturing pattern. In the case of the IR, the puncturer 216 outputs the coded bits in the order of [$X_1$ $Y_{11}$ $X_2$ $Z_{21}$] at initial transmission and in the order of [$Y_{21}$ $Z_{21}$ $Y_{12}$ $Z_{12}$] at retransmission for two input bits, by using [1 1 0 0 0 0; 1 0 0 0 0 1] and [0 0 1 0 0 1; 0 1 0 0 1 0] as the puncturing patterns at initial transmission and retransmission, respectively. Meanwhile, though not separately illustrated, an R=⅓ turbo encoder adopted by the 3GPP2 can be realized by the first channel encoder 210 and the puncturer 216 of FIG. 2.

A packet data transmission operation by the AMCS system and the HARQ system realized by FIG. 1 will be described herein below. Before transmission of a new packet, the controller 120 of the transmitter determines a proper modulation mode and data rate based on the downlink channel condition information provided from the receiver. The controller 120 provides information on the determined modulation mode and coding rate to the channel encoder 112, a modulator 116 and a frequency spreader 118. A data rate in a physical layer depends upon the determined modulation mode and coding rate. The channel encoder 112 performs bit puncturing according to a given puncturing pattern after performing the encoding by the determined modulation mode and coding rate. The coded bits output from the channel encoder 112 are provided to the channel interleaver 114, in which they are subject to interleaving. The interleaving is a technique for preventing a burst error by randomizing the input bits to disperse data symbols into several places instead of concentrating the data symbols in the same place in a fading environment. For ease of explanation, the size of the channel interleaver 114 is assumed to be larger than or equal to the total number of the coded bits. The modulator 116 symbol-maps the interleaved coded bits according to the determined modulation mode, and outputs modulated symbols. If the modulation mode is represented by M, the number of coded bits constituting one symbol is $\log_2 M$. The frequency spreader 118 assigns multiple Walsh codes for transmitting the modulated symbols at the determined data rate, and spreads the modulated symbols with the assigned Walsh codes. When a fixed chip rate and a fixed spreading factor (SF) are used, a rate of symbols transmitted with one Walsh code is constant. Therefore, in order to use the determined data rate, it is necessary to use multiple Walsh codes. For example, when a system using a chip rate of 3.84 Mcps and an SF of 16 chips/symbol uses 16 QAM and a channel coding rate 3/4, a data rate that can be provided with one Walsh code becomes 1.08 Mbps. Therefore, when 10 Walsh codes are used, it is possible to transmit at a data rate of a maximum of 10.8 Mbps.

It is assumed in the transmitter of the high-speed packet transmission system of FIG. 1 that the modulation mode and coding rate determined by the AMCS at initial transmission are used even at retransmission. However, as described before, the high-speed data transmission channel is subject to a change in its channel condition, even in a retransmission period by the HARQ, due to the change in the number of UEs in a cell and the Doppler shift. Therefore, maintaining the modulation mode and the coding rate used at initial transmission results in a reduction in the system performance.

For this reason, the ongoing HSDPA and 1xEV-DV standardizations consider an improved method for changing the modulation mode and the coding rate even in the retransmission period. For example, in a system using the CC as the HARQ, when the HARQ type is changed, a transmitter retransmits a part or the whole of the initially transmitted data packet, and a receiver partially combines the partially retransmitted packet with the whole of the initially transmitted packet, resulting in a reduction in the entire bit error rate of a decoder. Structures of the transmitter and the receiver are illustrated in FIGS. 3 and 4, respectively.

As illustrated in FIG. 3, the transmitter for the improved method further includes a partial Chase encoder 316 in addition to the transmitter of FIG. 1. Referring to FIG. 3, coded bits generated by encoding input data according to a given modulation mode and coding rate by a channel encoder 312 are provided to the partial chase encoder 316 after being interleaved by an interleaver 314. The partial Chase encoder 316 controls an amount of data (or the number of data bits) to be transmitted at retransmission among the interleaved coded bits based on information on a modulation mode used at initial transmission, a current modulation mode, and the number of Walsh codes to be used, provided from the controller 322. A modulator 318 performs symbol-mapping on the coded bits output from the partial Chase encoder 316 according to a given modulation mode, and provides its output to a spreader 320. The spreader 320 assigns a needed number of Walsh codes among the available Walsh codes, and frequency-spreads the data symbols received from the modulator 318 with the assigned Walsh codes. Here, the channel coding rate at retransmission is identical to the channel coding rate at initial transmission, and the number of the Walsh codes to be used at retransmission may be different from the number of the Walsh codes used at initial transmission. However, it will be assumed herein that the number of Walsh codes to be used at retransmission is identical to the number of Walsh codes used at initial transmission. Therefore, a symbol rate for the retransmission is identical to a symbol rate for the initial transmission, so it is necessary to adjust the number of the retransmitted coded bits.

FIG. 4 illustrates a structure of a receiver corresponding to the transmitter of FIG. 3. The receiver further includes a partial Chase combiner 416 corresponding to the partial Chase encoder 316 of FIG. 3, in addition to the existing receiver. A despreader 412 despreads the data symbols from the transmitter with the same Walsh codes as used by the transmitter, and provides its output to a demodulator 414. The demodulator 414 demodulates the data symbols from the despreader 412 by a demodulation mode corresponding to the modulation mode used by the transmitter, and outputs a corresponding LLR (Log Likelihood Ratio) value to the partial Chase combiner 416. The LLR value is a value determined by performing soft decision on the demodulated coded bits. The partial Chase combiner 416 substitutes for the soft combiner in the existing receiver. This is because when the modulation used at initial transmission is different from the modulation used at retransmission, the packet combining is partially performed since an amount of the retransmitted data is different from an amount of the initially transmitted data. If the high-order modulation is used at retransmission, the partial Chase combiner 416 performs combining on the whole packet. However, if the low-order modulation is used at retransmission, the partial Chase combiner 416 performs partial combining. A deinterleaver 418 deinterleaves the data from the partial Chase combiner 416 and provides the deinterleaved data to a channel decoder 420. The channel decoder 420 decodes the deinterleaved coded bits into information bits. Though not illustrated in FIG. 4, the receiver performs CRC (Cyclic Redundancy Check) checking on the information bits, and transmits an ACK (Acknowledge) or a NACK (Negative Acknowledge) signal as a confirmation signal to the transmitter according to the CRC checking results, thus to request transmission of new data or retransmission of the errored packet.

FIGS. 5A and 5C illustrate a change in the size of the packet encoded by the partial Chase encoder 316 according to a change in the modulation mode at initial transmission and retransmission.

First, if a modulation rate (or modulation order) at retransmission is lower than a modulation rate at initial transmission, the coded bits output from the partial Chase encoder 316 are less in number at retransmission compared with initial transmission, as illustrated in FIG. 5A. It is assumed in FIG. 5A that 16 QAM is used at initial transmission and QPSK is used at retransmission. Therefore, at retransmission, the transmitter transmits only half of the data packet transmitted at initial transmission.

Next, if a modulation rate at retransmission is higher than a modulation rate at initial transmission, the coded bits output from the partial Chase encoder 316 are larger in number at retransmission compared with initial transmission, as illustrated in FIG. 5C. It is assumed in FIG. 5C that QPSK is used at initial transmission and 16 QAM is used at retransmission. Therefore, at retransmission, the transmitter repeats twice the data packet transmitted at initial transmission.

FIGS. 5B and 5D illustrate a received packet combined by the partial Chase combiner 416 according to a change in the modulation mode at initial transmission and retransmission.

First, if a modulation rate at retransmission is lower than a modulation rate at initial transmission, i.e., if 16 QAM is used at initial transmission and QPSK is used at retransmission, then the receiver additionally receives, at retransmission, only half of the data packet transmitted at initial transmission, as illustrated in FIG. 5B. Therefore, the partial Chase combiner 416 combines the packet received at initial transmission with the half packet received at retransmission, thus to increase reliability of the received signal.

Next, if a modulation rate at retransmission is higher than a modulation rate at initial transmission, i.e., if QPSK is used at initial transmission and 16 QAM is used at retransmission, then the receiver repeatedly receives, at retransmission, the packet transmitted at initial transmission twice, as illustrated in FIG. 5D. Therefore, the partial Chase combiner 416 combines the same packets received three times through initial transmission and retransmission, thus to increase reliability of the received signal.

The high-speed packet transmission system using the CC as the HARQ uses the partial Chase encoder 316 and the partial Chase combiner 416 illustrated in FIGS. 3 and 4, so it can more actively adapt to a change in the channel environment by changing the modulation mode even at retransmission, resulting in an improvement in the system performance. The partial combining on the whole transmission packet contributes to a decrease in the bit error rate, but fails to satisfactorily contribute to a reduction in the frame error rate. This is because the output of the channel interleaver 314 of FIG. 3 is a random combination of the systematic bits and the parity bits from the channel encoder 312. That is, if the packet size at retransmission is smaller than the packet size at initial transmission, the combining cannot be performed on all of the information bits, so the combining effect occurs randomly in a bit unit. In particular, there is a demand for a new method for remarkably reducing a frame error rate by compensating the whole information bits using the feature that the turbo code should be transmitted in combination of the systematic bits and the parity bits even when the system using the CC is required to transmit a smaller packet at retransmission than at initial transmission.

SUMMARY OF THE INVENTION

It is, therefore, an object of the present invention to provide a data transmission/reception apparatus and method for improving performance of a radio communication system.

It is another object of the present invention to provide a data transmission/reception apparatus and method for receiving data bits at increased reception probability in a radio communication system.

It is further another object of the present invention to provide an apparatus and method for efficiently transmitting/receiving high-speed data, using separate channel interleavers for systematic bits and parity bits from a turbo encoder, and also using separate deinterleavers at a receiver, each corresponding to the channel interleavers.

It is yet another object of the present invention to provide an apparatus and method for efficiently transmitting/receiving high-speed data by interlocking separate channel interleavers for systematic bits and parity bits from a turbo encoder with Chase combining-type HARQ.

It is still another object of the present invention to provide an apparatus and method for obtaining a system performance gain by adaptively changing a modulation mode while maintaining a channel coding rate used at initial transmission even at retransmission in a transmitter of a high-speed radio communication system employing an adaptive modulation and coding scheme (AMCS).

It is still another object of the present invention to provide a control apparatus and method for obtaining a system performance gain by selectively retransmitting one of the data packets divided into systematic bits and parity bits according to a required modulation mode, in a transmitter of a high-speed radio communication system employing an AMCS.

It is still another object of the present invention to provide a control apparatus and method for obtaining a performance gain by selectively soft-combining a data packet selectively retransmitted by desired modulation with an initially transmitted data packet at a receiver in a high-speed radio communication system.

In accordance with a first aspect of the present invention, there is provided a method for retransmitting data at a retransmission request from a receiver by a transmitter in a CDMA mobile communication system including a turbo encoder with a given coding rate and initially transmitting systematic bits and parity bits obtained by encoding the data by the turbo encoder using one modulation mode among a plurality of modulation modes. The method comprises determining a modulation mode to be used between the transmitter and the receiver in response to the retransmission request; distributing coded bits obtained by encoding the data at the coding rate into systematic bits and parity bits; and if the determined modulation mode is different from the modulation mode used at initial transmission, modulating into modulated symbols coded bits transmittable by the determined modulation mode among the systematic bits and the parity bits at the initial transmission, and transmitting the modulated symbols.

In accordance with a second aspect of the present invention, there is provided an apparatus for retransmitting data at a retransmission request from a receiver by a transmitter in a CDMA mobile communication system including a turbo encoder with a given coding rate and initially transmitting systematic bits and parity bits obtained by encoding the data by the turbo encoder using one modulation mode among a plurality of modulation modes. The apparatus comprises a controller for determining a modulation mode to be used between the transmitter and the receiver in response to the retransmission request; a distributor for distributing coded bits obtained by encoding the data at the coding rate into systematic bits and parity bits; a selector for selecting coded bits transmittable by the determined modulation mode among the systematic bits and the parity bits at the initial transmission, if the determined modulation mode is different from the modulation mode used at initial transmission; and a modulator for modulating the transmittable coded bits into modulated symbols according to the determined modulation mode.

In accordance with a third aspect of the present invention, there is provided a method for receiving modulated symbols retransmitted by a transmitter according to a modulation mode different from a modulation mode used at initial transmission in a CDMA mobile communication system including a turbo encoder with a given coding rate and initially transmitting systematic bits and parity bits obtained by encoding data by the turbo encoder as modulated symbols using one modulation mode among a plurality of modulation modes. The method comprises demodulating the modulated symbols according to a demodulation mode corresponding to the modulation mode used by the transmitter at retransmission, and outputting coded bits; distributing the coded bits into systematic packets comprised of the systematic bits and parity packets comprised of the parity bits; combining the systematic packets with previously received systematic packets, and combining the parity packets with previously received parity packets; and decoding the combined systematic packet and parity packets into information bits.

In accordance with a fourth aspect of the present invention, there is provided an apparatus for receiving modulated symbols retransmitted by a transmitter according to a modulation mode different from a modulation mode used at initial transmission in a CDMA mobile communication system including a turbo encoder with a given coding rate and initially transmitting systematic bits and parity bits obtained by encoding data by the turbo encoder as modulated symbols using one modulation mode among a plurality of modulation modes. The apparatus comprises a demodulator for demodulating the modulated symbols according to a demodulation mode corresponding to the modulation mode used by the transmitter at retransmission, and outputting coded bits; a packet distributor for distributing the coded bits into systematic packets comprised of the systematic bits and parity packets comprised of the parity bits; a combiner for combining the systematic packets with previously received systematic packets, and combining the parity packets with previously received parity packets; and a decoder for decoding the combined systematic packet and parity packets into information bits.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In the following description, the present invention provides preferable embodiments in which a channel encoder supports a coding rate of 1/2 and 3/4, and a transmitter uses 16 QAM among QPSK, 8PSK, 16 QAM, and 64 QAM modulations at initial transmission and changes the modulation mode to another modulation mode at retransmission. Further, a receiver uses Chase combining-type HARQ. The embodiments of the present invention will be described herein below with reference to accompanying drawings.

Figure 1:
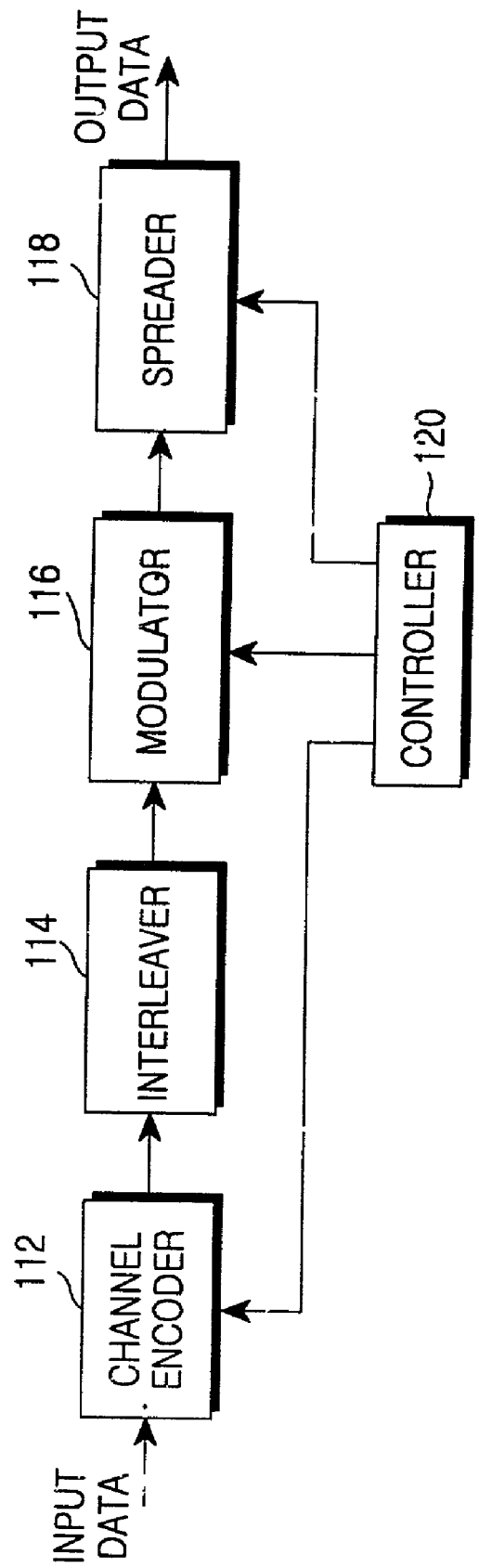
FIG. 1 illustrates a structure of a transmitter in a general CDMA mobile communication system for high-speed data transmission.
Figure 2:
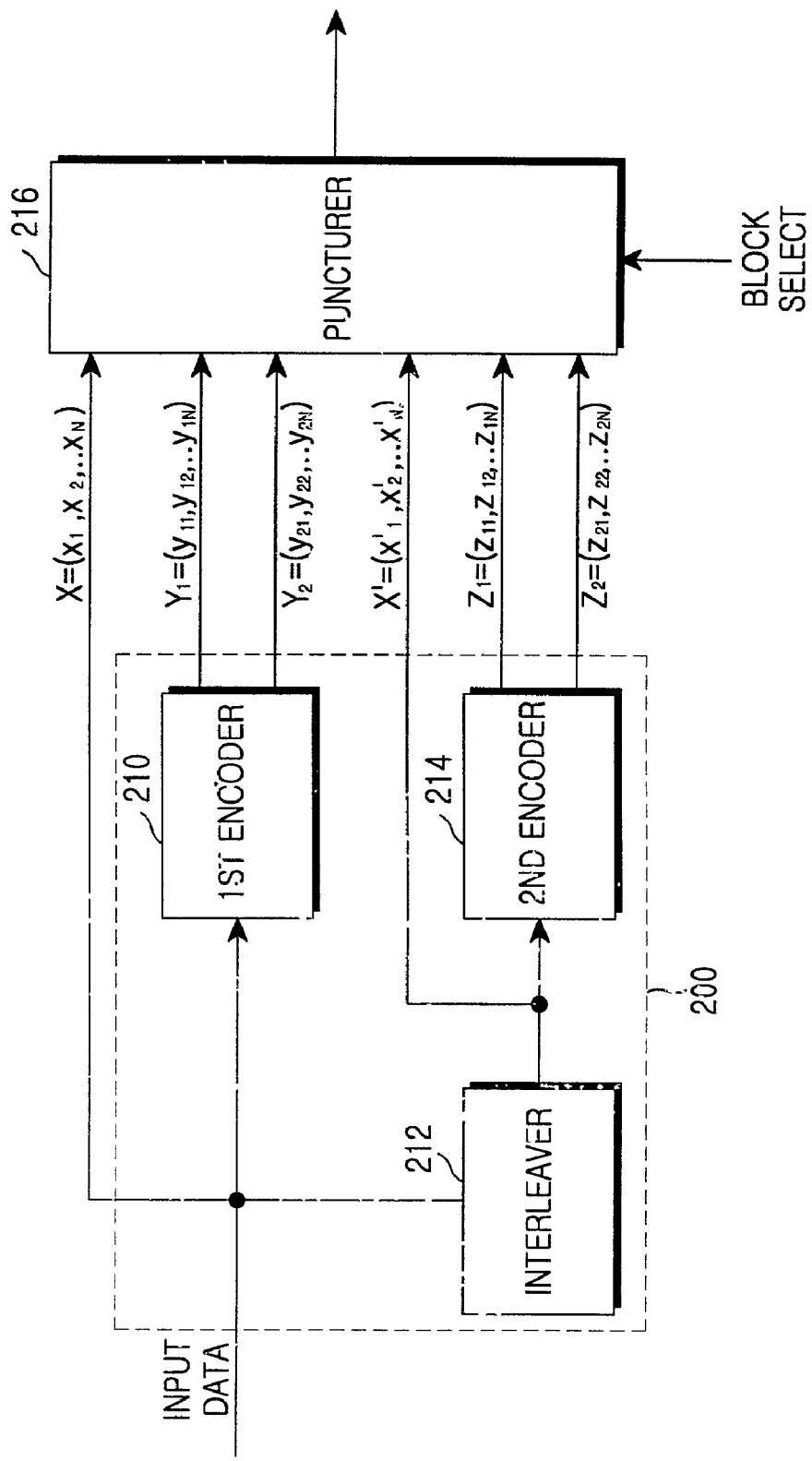
FIG. 2 illustrates a detailed structure of the channel encoder in FIG. 1.
Figure 3:
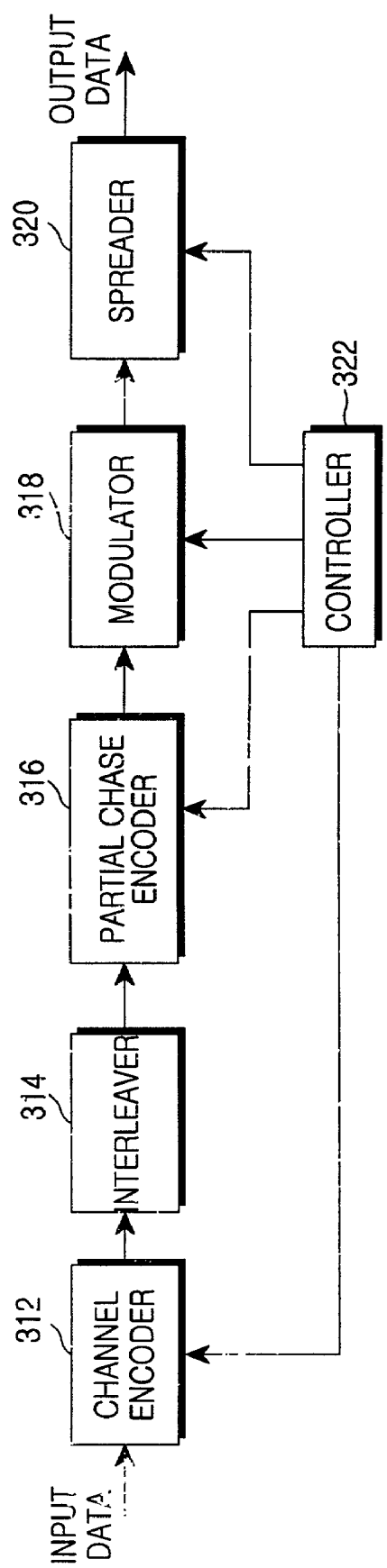
FIG. 3 illustrates a structure of a transmitter using variable modulation at retransmission in a conventional CDMA mobile communication system for high-speed data communication.
Figure 4:
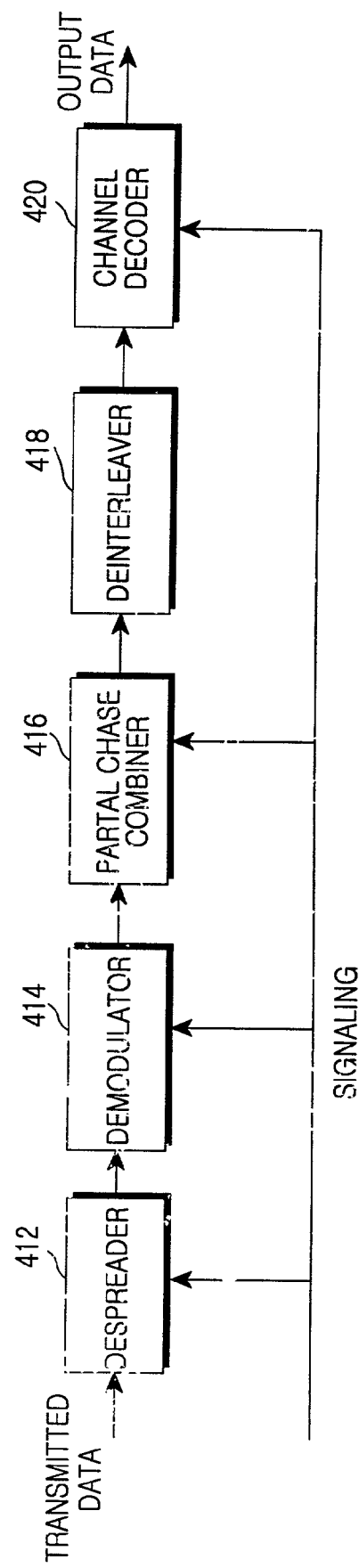
FIG. 4 illustrates a structure of a receiver corresponding to the transmitter of FIG. 3.
Figure 5:
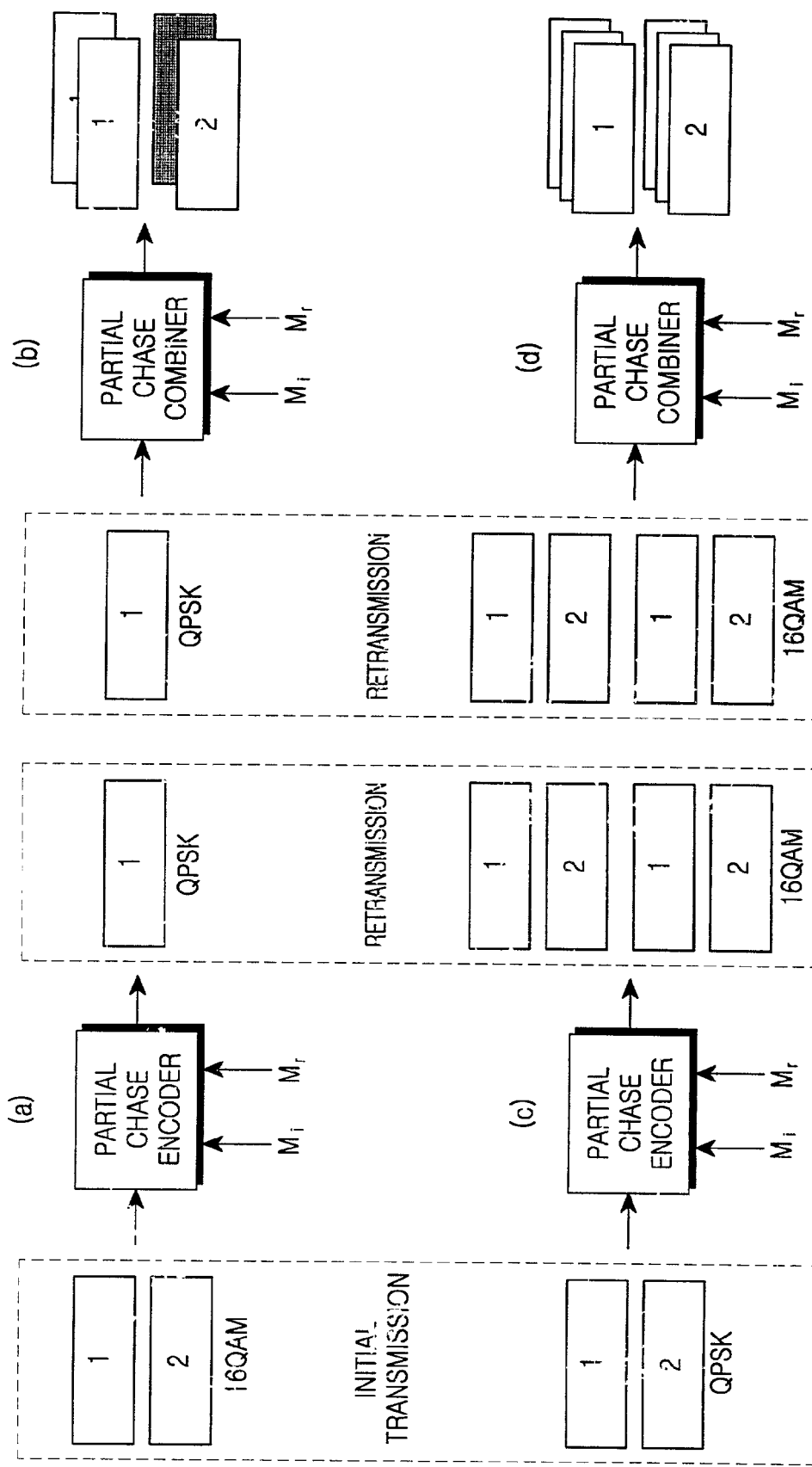
FIGS. 5A and 5D illustrate an exemplary method of performing coding and combining according to a variation in modulations.
Figure 6:
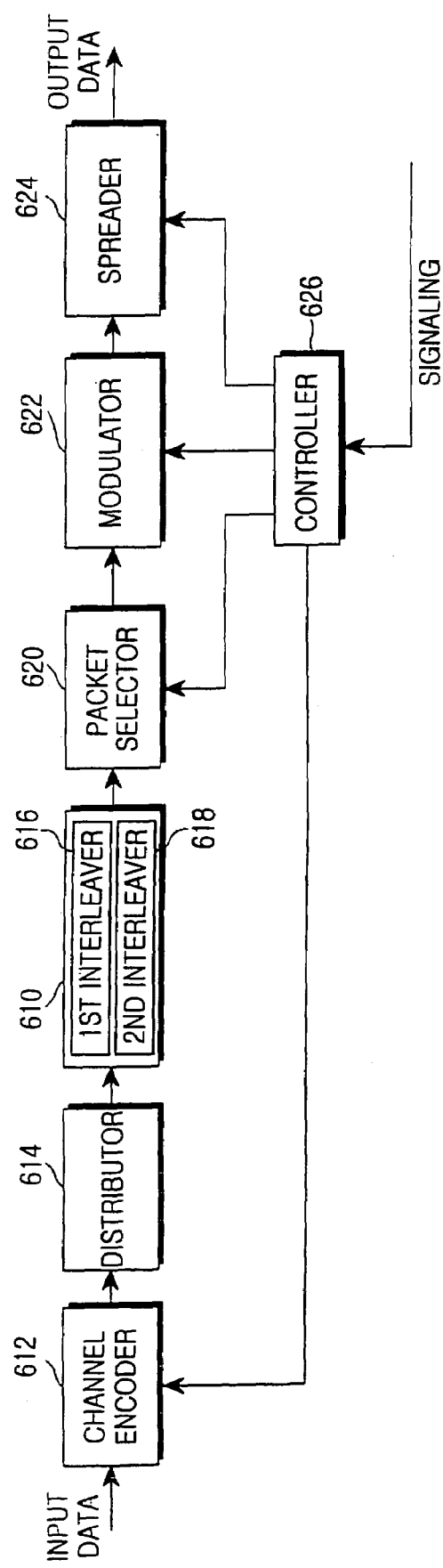
FIG. 6 illustrates a structure of a transmitter in a CDMA mobile communication system according to an embodiment of the present invention.

FIG. 6 illustrates a structure of a transmitter in a CDMA mobile communication system according to an embodiment of the present invention. Referring to FIG. 6, a controller (for AMCS) 626 controls the overall operation of the transmitter according to an embodiment of the present invention. In particular, the controller 626 determines a modulation mode and a coding rate of transmission data based on signaling information provided from an upper layer (not shown). The controller 626 determines the number of orthogonal codes (e.g., Walsh codes) required by a frequency spreader 624 based on the determined modulation mode and coding rate. Alternatively, the modulation mode and the coding rate can be determined by the upper layer and then provided to the controller 626 along with the signaling information. A typical method for determining the modulation mode is to determine the modulation mode according to a state of the downlink traffic channel transmitting data, at initial transmission and each retransmission. Therefore, the controller 626 can determine different modulation modes at initial transmission and each retransmission. The initial transmission is performed upon receipt of an ACK signal from a receiver, and the retransmission is performed upon receipt of a NACK signal from the receiver. The state of the downlink traffic channel can be detected depending upon information on the downlink traffic channel currently transmitted by the receiver. The determined modulation mode information is provided to a packet selector 620 and a modulator 622. Further, the determined coding rate information is provided to a channel encoder 612.

The channel encoder 612 encodes input data with a given code at the coding rate provided from the controller 626, and outputs coded bits. The input data includes CRC for error checking at the receiver. The "given code" refers to a code used to output coded bits comprised of bits for encoding the input data before transmission and error control bits for the bits. For example, when a turbo code is used as the given code, the transmission bits become systematic bits and the error control bits become parity bits. Meanwhile, the channel encoder 612 is divided into an encoder and a puncturer. The encoder encodes the input data at a given coding rate, and the puncturer determines a ratio of the systematic bits to the parity bits output from the encoder according to the coding rate. For example, if the given coding rate is a symmetric coding rate 1/2, the channel encoder 612 receives one input bit and outputs one systematic bit and one parity bit. However, if the given coding rate is an asymmetric coding rate 3/4, the channel encoder 612 receives three input bits and outputs three systematic bits and one parity bit. Here, a description of the present invention will be made separately for the coding rates 1/2 and 3/4.

A distributor 614 distributes the systematic bits and the parity bits received from the channel encoder 612 to a plurality of interleavers. When the interleavers include two interleavers 616 and 618, the distributor 614 distributes the systematic bits and the parity bits into two bit groups. For example, the distributor 614 distributes the systematic bits from the channel encoder 612 to the first interleaver 616, and the remaining parity bits to the second interleaver 618. In this case, if the symmetric coding rate 1/2 is used, the number of symmetric bits output from the channel encoder 612 is equal to the number of parity bits output from the channel encoder 612, so the first interleaver 616 and the second interleaver 618 are filled with the same number of coded bits. However, if the asymmetric coding rate 3/4 is used, the number of symmetric bits filled in the first interleaver 616 is 3 times larger than the number of parity bits filled in the second interleaver 618.

The first interleaver 616 interleaves the systematic bits from the distributor 614, and the second interleaver 618 interleaves the parity bits from the distributor 614. In FIG. 6, the first interleaver 616 and the second interleaver 618 are separated by hardware. However, the first interleaver 616 and the second interleaver 618 can be simply logically separated. The logical separation means dividing one memory into a memory area for storing the systematic bits and another memory area for storing the parity bits.

The packet selector 620 receives information on a modulation mode from the controller 626, and determines an amount of data that can be normally transmitted by the modulation mode. After determining an amount of the transmittable data, the packet selector 620 selects one of given packets each divided into systematic bits and parity bits provided from the first interleaver 616 and the second interleaver 618. The given packets can be divided into a systematic packet comprised of only the systematic bits and a parity packet comprised of only the parity bits. Commonly, the transmitter transmits data in a TTI (Transmission Time Interval) unit. The TTI means a time period from a point where transmission of coded bits starts to a point where transmission of the coded bits ends. The TTI has a slot unit. For example, the TTI is comprised of 3 slots. Therefore, the given packets mean the coded bits transmitted for the TTI.

Figure 8A:
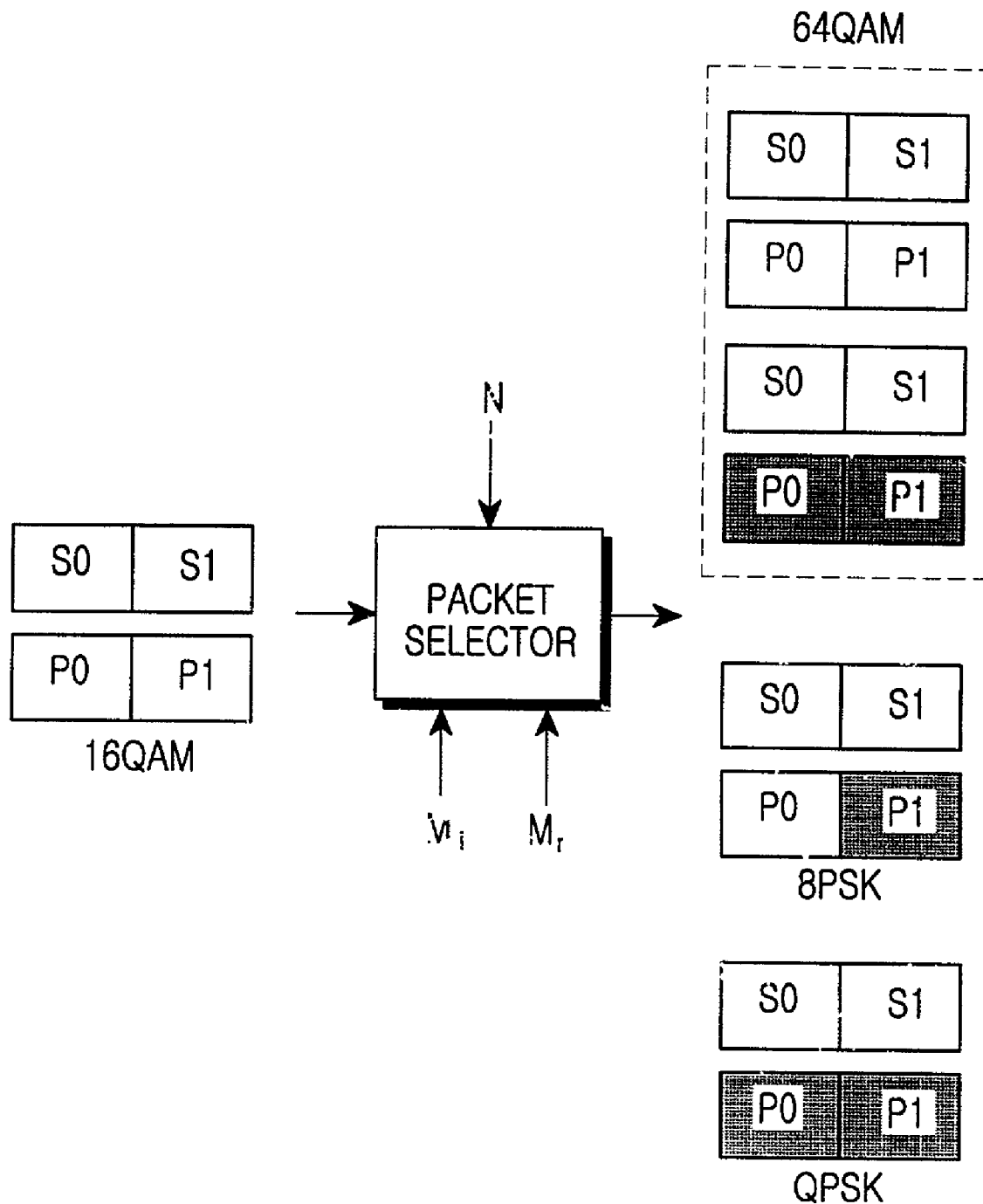
FIGS. 8A and 8B illustrate an exemplary method of selecting transmission packets by the transmitter upon a change in a modulation mode at retransmission, according to an embodiment of the present invention.
Figure 8B:
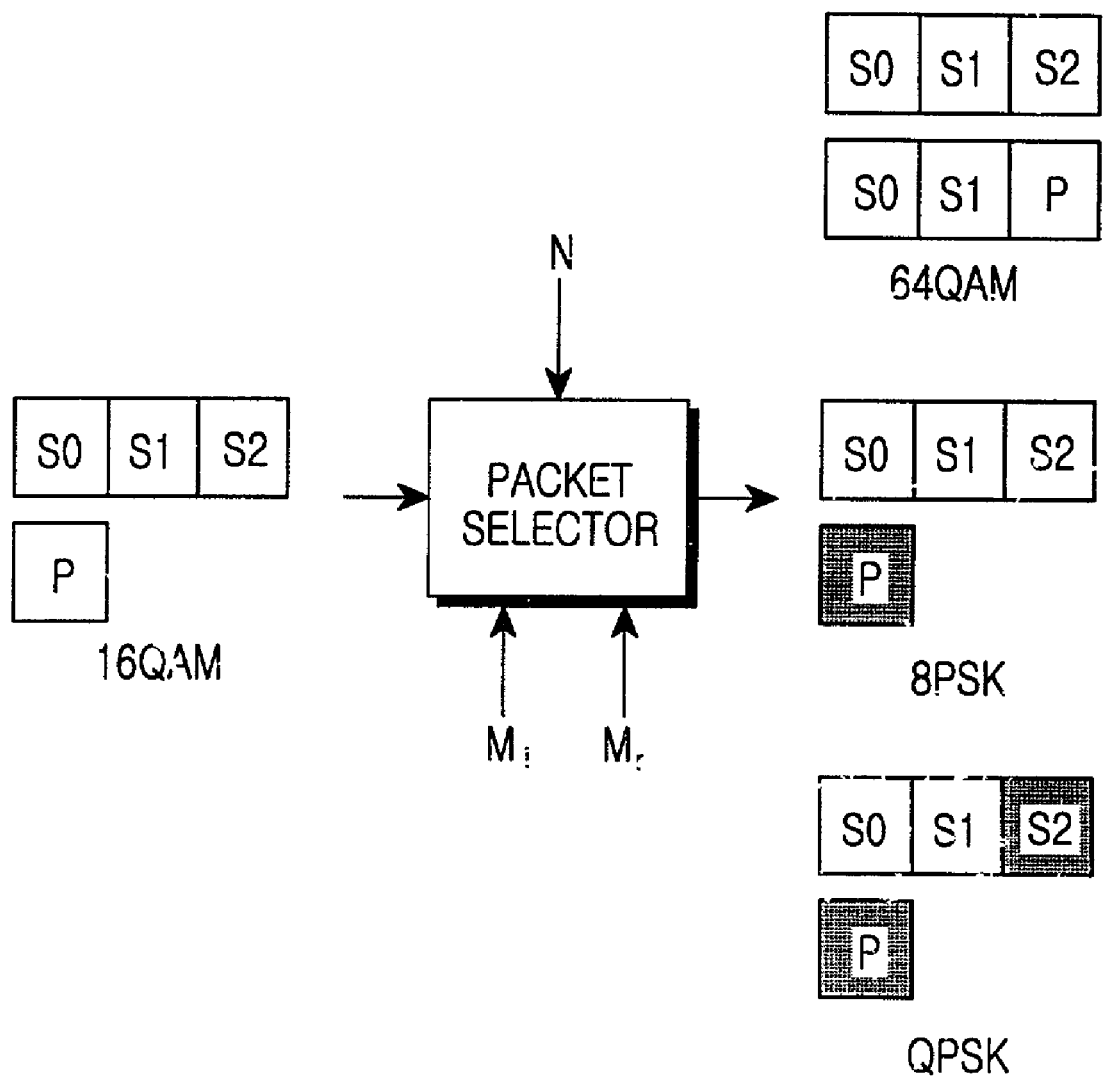

Meanwhile, as described above, the packet selector 620 can be provided with information on the different modulation modes from the controller 626 at initial transmission and each retransmission. Therefore, each time the modulation mode is changed, the packet selector 620 should properly select the transmission packet according to the changed modulation mode. For example, at initial transmission, the packet selector 620 selects the systematic bits and the parity bits in the TTI unit. However, if the modulation mode is changed at retransmission, the packet selector 620 cannot transmit the intact packet transmitted at the initial transmission. Therefore, the packet selector 620 separates the systematic packet and the parity packet initially transmitted in the TTI unit into a plurality of sub-packets with a given size, and selects the sub-packets according to the determined data amount. When the determined data amount is smaller than the initially transmitted data amount, the packet selector 620 selects a part of the sub-packets. However, when the determined data amount is larger than the initially transmitted data amount, the packet selector 620 repeatedly selects the sub-packets and a part of the sub-packets. Therefore, the sub-packets should have a size determined such that it is possible to freely vary an amount of the transmission data according to the variable modulation mode. In addition, the packet selector 620 should consider both priority of the coded bits to be transmitted and the number of retransmissions in selecting the packets according to the data amount. That is, when transmitting a part of the initially transmitted systematic packet and parity packet, the packet selector 620 first selects the systematic packet, actual information bits. Here, the "systematic packet" refers to a packet comprised of the systematic bits transmitted in a TTI unit at initial transmission, and the "parity packet" refers to a packet comprised of the parity bits transmitted in a TTI unit at initial transmission. In addition, when repeatedly transmitting a part of the initially transmitted systematic packet and parity packet, the packet selector 620 first selects the systematic packet. However, in order to improve the system performance, it is preferable to transmit other non-transmitted packets instead of transmitting only the systematic packet at each retransmission. To this end, the packet selector 620 may use the number of retransmissions. For example, if the number of retransmissions is an odd number, the packet selector 620 first transmits the systematic packet, and if the number of retransmissions is an even number, the packet selector 620 first transmits the parity packet. Therefore, at retransmission, the packet selector 620 outputs only the systematic bits, only the parity bits, or a combination of the systematic bits and the parity bits. FIGS. 8A and 8B illustrate patterns for selecting the coded bits according to various modulation modes by the packet selector 620. A detailed description of the patterns will be made later.

The modulator 622 modulates the coded bits of the packets selected by the packet selector 620 according to the modulation mode provided from the controller 626. Mapping the coded bits to transmission symbols by a given symbol mapping technique performs modulation on the coded bits. A mapping pattern of the transmission symbols is determined according to the modulation mode information provided from the controller 626. For example, if the modulation mode provided from the controller 626 is 16 QAM, the symbols have a symbol pattern {H,H,L,L}, and if the modulation mode is 64 QAM, the symbols have a symbol pattern {H,H,M,M,L,L}, where H represents a bit position having higher reliability, M represents a bit position having medium reliability, and L represents a bit position having lower reliability. Meanwhile, if the modulation mode provided from the controller 626 is 8PSK, the symbols have a symbol pattern comprised of 3 bit positions, and if the modulation mode is QPSK, the symbols have a symbol pattern comprised of 2 bit positions.

The spreader 624 frequency-spreads the symbols output from the modulator 622 with the orthogonal codes (e.g., Walsh codes) assigned by the controller 626, and transmits the spread symbols to the receiver. The number of the orthogonal codes is determined according to the modulation mode and the channel coding rate determined by the controller 626, and assigned to the symbols output from the modulator 622.

Figure 10:
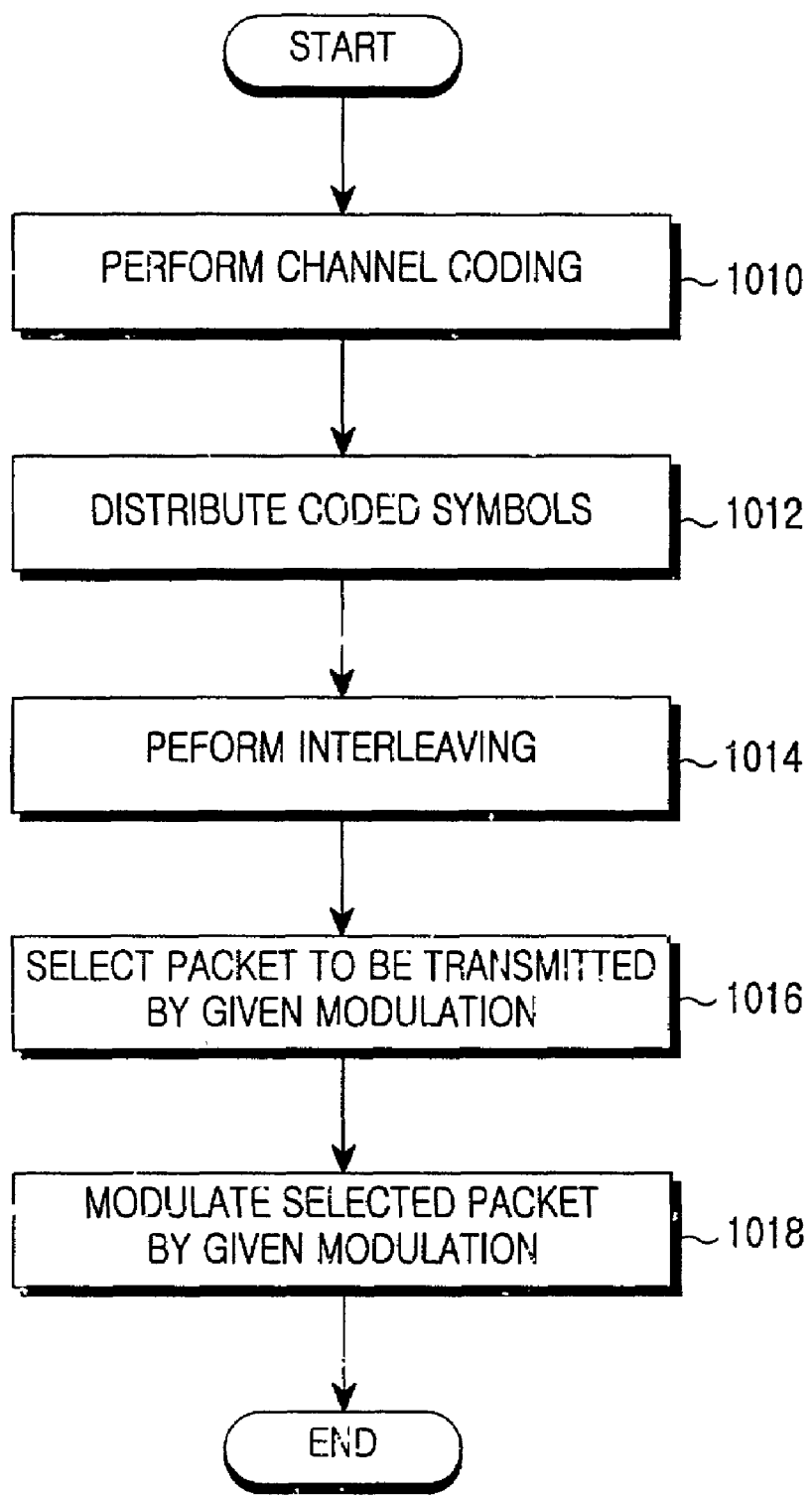
FIG. 10 illustrates an operating process of the transmitter in a CDMA mobile communication system according to an embodiment of the present invention.

FIG. 10 illustrates an operating process of the transmitter according to an embodiment of the present invention. As illustrated in FIG. 10, an operation of the transmitter according to an embodiment of the present invention includes a first process of encoding transmission data into coded bits (step 1010) and distributing the coded bits (step 1012), and a second process of interleaving the distributed coded bits (step 1014), selecting coded bits to be transmitted among the interleaved coded bits according to a modulation mode changeable at initial transmission and each retransmission (step 1016), and modulating the selected coded bits according to the modulation mode (step 1018).

Figure 7:
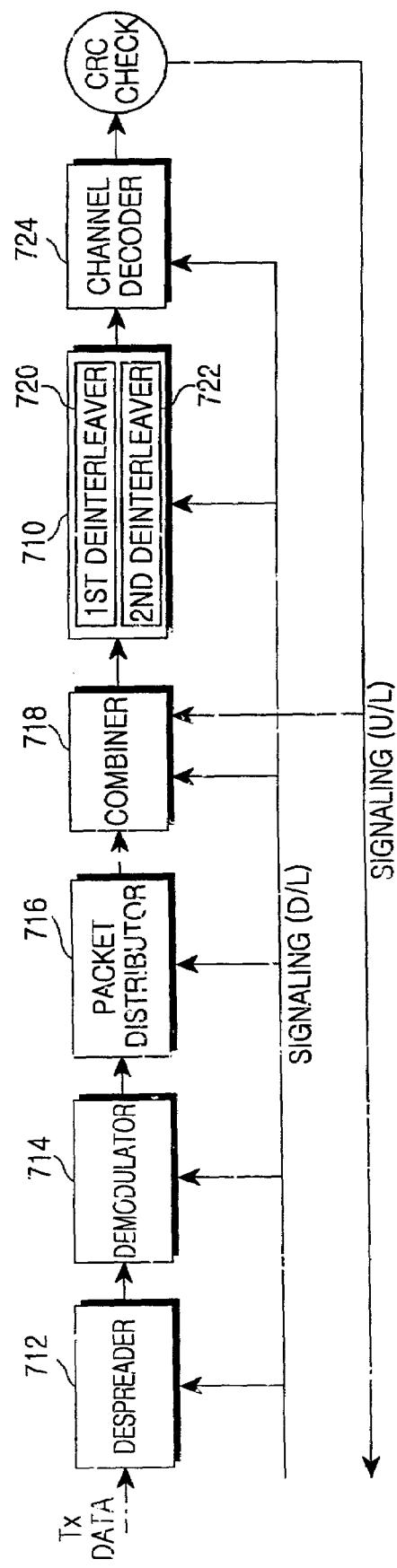
FIG. 7 illustrates a structure of a receiver in a CDMA mobile communication system according to an embodiment of the present invention.

FIG. 7 illustrates a structure of a receiver, corresponding to the transmitter of FIG. 6, according to an embodiment of the present invention. Referring to FIG. 7, the receiver receives, over a downlink traffic channel, data symbols transmitted by the transmitter after being frequency-spread by multiple orthogonal codes. A despreader 712 despreads the received data symbols with the orthogonal codes used by the transmitter, multiplexes the despread transmitted symbols, and serially outputs the multiplexed symbols.

A demodulator 714 demodulates the transmitted symbols output from the despreader 712 by a demodulation mode corresponding to the modulation mode used by the transmitter, and outputs demodulated symbols. The demodulated symbols correspond to the coded bits output from the packet selector 620 in the transmitter, and have an LLR value due to the noises on the radio channel.

A packet distributor 716 receives the LLR values of the demodulated symbols output from the demodulator 714, and distributes the demodulated symbols into a systematic packet and a parity packet by the modulation mode used in the transmitter. The systematic packet refers to a packet comprised of the systematic bits, and the parity packet refers to a packet comprised of the parity bits. In order to distribute the demodulated symbols, the packet distributor 716 determines characteristics of the demodulated symbols using information on the initial modulation mode, the current modulation mode, and the number of retransmissions. The characteristics of the demodulated symbols represent whether the demodulated symbols constitute a systematic packet comprised of systematic bits, a parity packet comprised of parity bits, or a combination of the systematic bits and the parity bits. The packet distributor 716 distributes the demodulated symbols to a combiner 718 according to the decided characteristics.

The combiner 718 is comprised of a first buffer for the systematic packet and a second buffer for the parity packet. Therefore, the combiner 718 performs combining, in a bit unit, on the previously stored systematic bits constituting a systematic packet at initial transmission, the systematic bits constituting a systematic packet at each retransmission, and the systematic bits constituting a newly provided systematic packet, using the first buffer. Further, the combiner 718 performs combining, in a bit unit, on the previously stored parity bits constituting a parity packet at initial transmission, the parity bits constituting a parity packet at each retransmission, and the parity bits constituting a newly provided parity packet, using the second buffer. The combiner 718 performs separate combining on the systematic packet or the parity packet having the same characteristics as the packets distributed by the packet distributor 716.

For example, if the transmitter has transmitted only the systematic packet at retransmission, the packet distributor 716 provides the received systematic packet to the first buffer in the combiner 718, and the combiner 718 combines the systematic packet stored in the first buffer at initial transmission with the retransmitted systematic packet. At this point, the parity packet stored in the second buffer is not subject to the combining. However, if the transmitter has transmitted only the parity packet at retransmission, the packet distributor 716 provides the received parity packet to the second buffer in the combiner 718, and the combiner 718 combines the parity packet stored in the second buffer at initial transmission with the retransmitted parity packet. At this moment, the systematic packet stored in the first buffer is not subject to the combining.

A deinterleaving section 710, corresponding to an interleaving section 610 in the transmitter of FIG. 6, is comprised of two independent deinterleavers. Of the two deinterleavers, a first deinterleaver 720 deinterleaves the systematic bits constituting the combined systematic packet provided from the first buffer in the combiner 718, and a second deinterleaver 722 deinterleaves the parity bits constituting the combined parity packet provided from the second buffer in the combiner 718. Here, a deinterleaving pattern used by the deinterleaving section 710 has a reverse order of the interleaving pattern used by the interleaving section 610 of FIG. 6, so the deinterleaving section 710 should previously recognize the interleaving pattern.

A channel decoder 724 is divided into a decoder and a CRC checker according to the function. The decoder receives the coded bits comprised of the systematic bits and the parity bits from the deinterleaving section 710, decodes the received coded bits according to a given decoding mode, and outputs desired received bits. For the given decoding mode, the decoder uses a method of receiving systematic bits and parity bits, and then decoding the systematic bits. The decoding mode is determined according to the coding mode of the transmitter. The received bits output from the decoder include CRC bits added during data transmission by the transmitter. Therefore, the CRC checker checks the received bits using the CRC bits included in the received bits, thus determining whether an error has occurred. If it is determined that no error has occurred in the received bits, the CRC checker outputs the received bits and transmits an ACK signal as a response signal confirming receipt of the received bits. However, if it is determined that an error has occurred in the received bits, the CRC checker transmits a NACK signal requesting retransmission of the received bits as a response signal.

The first buffer and the second buffer in the combiner 718 are initialized or maintain the current state according to whether the transmitted confirmation signal is the ACK signal or the NACK signal. That is, when the ACK signal is transmitted, the first buffer and the second buffer are initialized to receive new packet. However, when the NACK signal is transmitted, the first buffer and the second buffer maintain the current state to prepare for combining with the retransmitted packet.

Meanwhile, for demodulation and decoding, the receiver should previously recognize information on the coding rate, the modulation mode, and the orthogonal codes, all used by the transmitter of FIG. 6, and the number of retransmissions. That is, the above information should be previously provided to the despreader 712, the demodulator 714, the distributor 716, the combiner 718, and the decoder 724 so that the receiver can perform a corresponding operation of the transmitter. Therefore, the above information is provided from the transmitter to the receiver over a downlink control channel.

Figure 11:
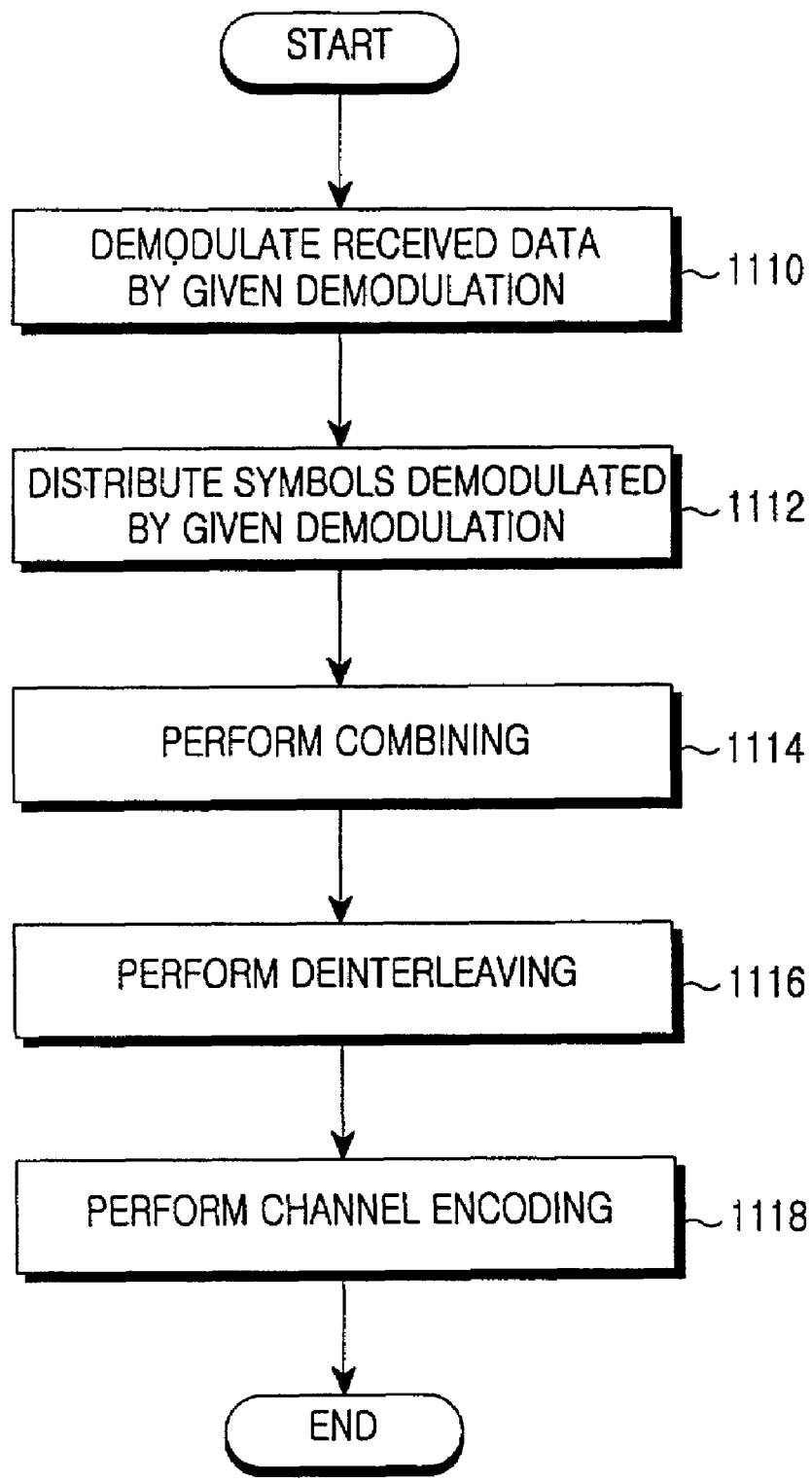
FIG. 11 illustrates an operating process of the receiver in a CDMA mobile communication system according to an embodiment of the present invention.

FIG. 11 illustrates an operating process of the receiver according to an embodiment of the present invention. As illustrated in FIG. 11, an operation of the receiver according to an embodiment of the present invention includes a first process of decoding received data into demodulated symbols (step 110) and distributing the demodulated symbols according to the modulated mode used in the transmitter (step 1112), and a second process of combining the distributed demodulated symbols with previously received demodulated symbols (step 1114), deinterleaving the combined symbols into coded bits (step 1116) and channel-decoding the coded bits (step 1118).

Before a detailed description of the present invention is made, the embodiments of the present invention will be described in brief herein below.

A first embodiment of the present invention provides a transceiver supporting different modulations at initial transmission and retransmission in a CDMA mobile communication system supporting a coding rate 1/2 and the CC-type HARQ. Here, 16 QAM modulation is used at initial transmission, and 64 QAM, 8PSK, and QPSK modulations are used at retransmission. Specifically, the first embodiment provides a transmitter for selecting coded bits to be transmitted according to a changed modulation mode at retransmission, and a receiver for effectively combining the transmitted coded bits.

A second embodiment of the present invention provides a transceiver supporting different modulations at initial transmission and retransmission in a CDMA mobile communication system supporting a coding rate 3/4 and the CC-type HARQ. Likewise, 16 QAM modulation is used at initial transmission, and 64 QAM, 8PSK, and QPSK modulations are used at retransmission. Specifically, the second embodiment also provides a transmitter for selecting coded bits to be transmitted according to a changed modulation mode at retransmission, and a receiver for effectively combining the transmitted coded bits.

1. First Embodiment (with a Coding Rate 1/2)

An operation of the first embodiment of the present invention will now be described in detail herein below with reference to the accompanying drawings. It will be assumed herein that the first embodiment uses a coding rate 1/2 and employs the CC as the HARQ. Further, it will be assumed that the first embodiment uses 16 QAM modulation at initial transmission, and uses the same number of orthogonal codes as used at the initial transmission, even at retransmission.

1.1 Transmission Operation 1.1.1 Channel Coding (Step 1010 of FIG. 10)

The CRC-added transmission data is input to the channel encoder 612, in which the input data is encoded with a given code at a coding rate 1/2 provided from the controller 626 and the coded bits are serially output. The coded bits are divided into systematic bits corresponding to transmission data and parity bits for error control over the transmission data. Since the coding rate used is a symmetric coding rate 1/2, the channel encoder 612 outputs the systematic bits and the parity bits in the same ratio. The systematic bits and the parity bits are subject to puncturing according to a given puncturing pattern by the puncturer included in the channel encoder 612. Using the CC-type HARQ, the same puncturing pattern is used at initial transmission and retransmission, so the channel encoder 612 outputs the same data bit stream at each transmission. That is, the channel encoder 612 outputs the same systematic bits and parity bits at initial transmission and each retransmission. Commonly, a structure for performing repetition and puncturing operations on the coded bits is required when a transport channel is subject to multiplexing or the coded bits output from the channel encoder 612 are not identical in number to the symbols transmitted over the air. The repetition and puncturing operations are called "rate matching". In the present invention, the channel encoder 612 performs the rate matching, and a detailed description of the rate matching will not be provided for simplicity.

1.1.2 Distribution of Coded Bits (Step 1012 of FIG. 10)

The coded bits serially output from the channel encoder 612 are separated into systematic bits and parity bits through the distributor 614, and then distributed to corresponding interleavers. For example, when the interleavers include two interleavers 616 and 618, the distributor 614 distributes the systematic bits to the first interleaver 616 and the parity bits to the second interleaver 618 in the same ratio, as the coding rate used is a symmetric coding rate 1/2.

1.1.3 Interleaving (Step 1014 of FIG. 10)

The distributed systematic bits from the distributor 614 are provided to the first interleaver 616, in which they are interleaved according to a given interleaving pattern. Further, the distributed parity bits from the distributor 614 are provided to the second interleaver 618, where they are interleaved according to a given interleaving pattern. The interleaved systematic bits and parity bits output from the first and second interleavers 616 and 618 are provided to the packet selector 620. The interleaving pattern of the first interleaver 616 can be either identical to or different from the interleaving pattern of the second interleaver 618. However, the receiver should also recognize the determined interleaving pattern.

1.1.4 Packet Selection (Step 1016 of FIG. 10)

The interleaved systematic bits and parity bits provided from the first interleaver 616 and the second interleaver 618 are selectively output by the packet selector 620. The packet selector 620 separates the interleaved systematic bits into a plurality of systematic sub-packets, and selects systematic sub-packets to be transmitted among the separated systematic sub-packets. Further, the packet selector 620 separates the interleaved parity bits into a plurality of parity sub-packets, and selects parity sub-packets to be transmitted among the separated parity sub-packets. The systematic sub-packets and parity sub-packets to be transmitted are determined based on information about the modulation mode used at initial transmission, the current modulation mode, and the number of retransmissions, provided from the controller 626.

1.1.5 Modulation by Current Modulation Mode (Step 1018 of FIG. 10)

The selected sub-packets from the packet selector 620 are provided to the modulator 622. The coded bits constituting the sub-packets provided to the modulator 622 are modulated by a symbol mapping method based on a given modulation mode provided from the controller 626. That is, the coded bits constituting the selected sub-packet must be mapped to the corresponding transmission symbols. The transmission symbols output from the modulator 622 are provided to the frequency spreader 624, where they are demultiplexed according to the number of the orthogonal codes determined by the controller 626, spread with the corresponding orthogonal codes, and then transmitted to the receiver.

As described in steps 1010 to 1018, the transmitter according to an embodiment of the present invention properly selects the interleaved coded bits according to an amount of the data that can be transmitted according to a modulation mode changed at retransmission, and transmits the selected coded bits according to the changed modulation mode.

Next, how the packet selector 620 selects the sub-packet to be transmitted according to a change in the modulations will be described in more detail.

FIG. 8A illustrates how the packet selector 620 in the transmitter employing the coding rate 1/2 selects a transmission packet at retransmission. In FIG. 8A, S represents a data packet (or S packet) comprised of only systematic bits, and P represents a data packet (or P packet) comprised of only parity bits. As illustrated in FIG. 8A, when the coding rate is 1/2, the S packet is identical to the P packet in size. In FIG. 8A, for the sake of convenience, the S packet is divided into two sub-packets S0 and S1 having the same size, and the P packet is also divided into two sub-packets P0 and P1 having the same size.

When the modulation mode is changed, an amount of the data to be actually transmitted is determined by Equations (1) and (2) below.

$$\alpha = \frac{\log_2 M_r}{\log_2 M_i} \quad (1)$$

$$D_r = \alpha \times D_i \quad (2)$$

In Equation (1), $M_i$ indicates a modulation mode at initial transmission, and $M_r$ indicates a modulation mode at retransmission. Further, in Equation (2), $D_i$ denotes the number of coded bits transmitted at initial transmission, and $D_r$ denotes the number of coded bits that can be transmitted at retransmission.

In Equations (1) and (2), the modulation modes of 64 QAM, 16 QAM, 8PSK, and QPSK have unique values of 64, 16, 8, and 4, respectively.

FIG. 8A illustrates a method of selecting a transmission data packet when a modulation mode at initial transmission is 16 QAM and a modulation mode at retransmission is changed to 64 QAM, 8PSK, and QPSK. At initial transmission, the whole data packets S0, S1, P0 and P1 are subject to symbol mapping such that 4 bits are mapped to one symbol. If the modulation mode is changed to the high-order modulation of 64 QAM at retransmission, the packet selector 620 requires 1.5 times the coded bits in accordance with Equations (1) and (2). This means that the packet selector 620 requires not only all of the currently coded bits but also another half of the coded bits. In this case, at retransmission, the transmitter according to the present invention transmits all of the initially transmitted coded bits and further transmits once again the whole systematic bits or the whole parity bits. That is, in the case of FIG. 8A, at retransmission, the transmitter transmits the data packets in pattern of (S0, S1, P0, P1, S0, S1) or (S0, S1, P0, P1, P0, P1). In this case, advantageously, the receiver can perform combining in a unit of the same sub-packet.

Unlike when the modulation mode is changed to 64 QAM at retransmission, if the modulation mode is changed to the low-order modulation of 8PSK or QPSK, the packet selector 620 requires a part of the initially transmitted packet, i.e., 3/4 or 1/2 times the whole packet, in accordance with Equations (1) and (2). For the respective low-order modulations, the packet selector 620 selects the sub-packets for transmission, as follows.

8PSK: (S0, S1, P0) or (S0, S1, P1) or (P0, P1, S0) or (P0, P1, S1)

QPSK: (S0, S1) or (P0, P1)

The reason that there are several sub-packet combinations is because in order to increase performance of a turbo decoder, priorities of the systematic bits and the parity bits may be changed as occasion demands. Therefore, it is possible to expect an increase in system performance by transmitting the sub-packets in the same combination or the sub-packets in the different combinations according to the number of retransmissions and the channel condition. When transmitting the packet mixedly comprised of the systematic bits and the parity bits as in the existing method, the transmitter should transmit only a part of the data packet encoded by the channel encoder 612, so that the transmitted data packet is inevitably subject to random combining at the receiver. Such a method is effective in reducing the bit error rate (BER), but relatively less effective in reducing a frame error rate (FER). Unlike this conventional method, the transmitter according to the present invention transmits once again the whole packet comprised of only the systematic bits or the parity bits. This is because it is possible to reduce the frame error rate by obtaining a combining effect for all of the previously transmitted information bits and then providing the combined coded bits to an input terminal of the turbo decoder.

1.2 Reception Operation

Next, an operation of receiving data will be described with reference to the receiver of FIG. 7 corresponding to the transmitter of FIG. 6.

1.2.1 Demodulation of Received Data (Step 1110 of FIG. 11)

Data received from the transmitter is despread into modulated symbols by the despreader 712 using multiple orthogonal codes used by the transmitter during transmission, and the despread symbols are serially output in the form of a data stream after being multiplexed. The demodulator 714 demodulates the data stream according to a demodulation mode corresponding to the modulation mode used by the modulator 622 in the transmitter, generates LLR values for the demodulated coded bits, and provides the LLR values to the distributor 716.

1.2.2 Distribution of Demodulated Symbols (Step 1112 of FIG. 11)

The distributor 716 distributes the LLR values of the demodulated coded bits to the systematic sub-packet buffer or the parity sub-packet buffer in the combiner 718 according to the information on the modulation mode at initial transmission, the current modulation mode, and the number of retransmissions. For example, the demodulated coded bits from the demodulator 714 are comprised of a systematic sub-packet and a parity sub-packet. Therefore, the distributor 716 can distribute the coded bits from the demodulator 714 into a systematic sub-packet and a parity sub-packet.

1.2.3 Combining (Step 1114 of FIG. 11)

Since the output of the distributor 716 is separated into the systematic sub-packet and the parity sub-packet, the combiner 718 has two buffers, a buffer for storing the systematic sub-packet and another buffer for storing the parity sub-packet. Therefore, the combiner 718 stores the systematic sub-packet from the distributor 716 in the first buffer and the parity sub-packet in the second buffer. Meanwhile, if the systematic sub-packet packet and the parity sub-packet from the distributor 716 are retransmitted sub-packets, the combiner 718 combines the systematic sub-packet and the parity sub-packet from the distributor 716 with the previously stored systematic sub-packet or parity sub-packet. The previously stored systematic sub-packet and parity sub-packet are the coded bits stored at initial transmission or stored at previous retransmission. Meanwhile, as the modulation mode can be changed at retransmission, the systematic sub-packet provided from the distributor 716 at the retransmission may be different from the systematic sub-packet provided at initial transmission or previous transmission, and the parity sub-packet provided from the distributor 716 at the retransmission may also be different from the parity sub-packet provided at initial transmission or previous transmission. Therefore, the combiner 718 can perform partial combining on the systematic sub-packet or the parity sub-packet provided from the distributor 716. That is, if an amount of the transmission data by the modulation mode used at retransmission is less than an amount of the transmission data by the modulation mode used at initial transmission or previous retransmission, the combiner 718 will perform partial combining. However, if an amount of the transmission data by the modulation mode used at retransmission is equal to an amount of the transmission data by the modulation mode used at initial transmission or previous retransmission, the combiner 718 will perform combining on all the transmitted coded bits. Meanwhile, if an amount of the transmission data by the modulation mode used at retransmission is larger than an amount of the transmission data by the modulation mode used at initial transmission or previous retransmission, the combiner 718 will perform combining on all the transmitted coded bits and then perform partial combining on the repeatedly transmitted coded bits.

As stated above, the combiner 718 includes the first buffer for storing the systematic sub-packet and the second buffer for storing the parity sub-packet, and the first buffer and the second buffer are emptied (or initialized) to store the next transmitted data, when the data from the transmitter is correctly processed. However, when a retransmission request is transmitted to the transmitter as the data from the transmitter is not correctly processed, the systematic sub-packet and the parity sub-packet previously stored in the first buffer and the second buffer are maintained for combining. The combiner 718 should previously recognize the changed modulation mode in order to perform combining by the changed modulation mode at retransmission. Information on the changed modulation mode can be provided from the transmitter over a downlink control channel such as a downlink dedicated physical control channel (DPCCH). The modulation mode information provided from the transmitter is provided from an upper layer (not shown) of the transmitter to the combiner 718.

1.2.4 Deinterleaving (Step 1116 of FIG. 11)

The coded bits combined by the combiner 718 are provided to the deinterleaving section 710. The deinterleaving section 710 also includes two deinterleavers 720 and 722 corresponding to the two buffers in the combiner 718. Of the two deinterleavers, the first deinterleaver 720 receives the systematic bits provided from the combiner 718, and deinterleaves the received systematic bits according to a given pattern. The second deinterleaver 722 receives the parity bits provided from the combiner 718, and deinterleaves the received parity bits according to a given pattern. The first deinterleaver 720 and the second deinterleaver 722 perform deinterleaving according to a deinterleaving pattern corresponding to the interleaving pattern used by the interleaving section 610 of the transmitter. To this end, the interleaving pattern used by the interleaving section 610 of the transmitter should be provided to the first deinterleaver 720 and the second deinterleaver 722. The interleaving pattern used by the interleaving section 610 of the transmitter can be provided from the transmitter over the downlink control channel such as the downlink dedicated physical control channel (DPCCH). The interleaving pattern provided from the transmitter is provided from the upper layer (not shown) of the transmitter to the first deinterleaver 720 and the second deinterleaver 722.

1.2.5 Channel Decoding (Step 1118 of FIG. 11)

The coded bits deinterleaved according to a given pattern used by the transmitter are provided to the channel decoder 724, where they are decoded according to a given demodulation mode. Of all of the coded bits transmitted at initial transmission, at least all of the systematic bits or all of the parity bits are combined to increase reliability of the data input to the decoder 724, resulting in an increase in the overall system performance. As stated above, the channel decoder 724 should previously recognize the modulation mode used by the transmitter in order to perform decoding on the coded bits. Likewise, information on the modulation mode can be provided from the transmitter over the downlink control channel such as the downlink dedicated physical control channel (DPCCH). The modulation mode information provided from the transmitter is provided from the upper layer (not shown) of the transmitter to the channel decoder 724. As the modulation mode can be changed at each retransmission, the modulation mode information should be provided from the transmitter to the receiver at each retransmission or each time the modulation mode is changed.

Meanwhile, the information bits decoded by the channel decoder 724 are subject to error checking using CRC bits included therein, to determine whether an error has occurred in the information bits. Upon detecting an error by the CRC checker, the upper layer transmits a NACK signal, a retransmission request signal, to the transmitter. However, if the CRC checker does not detect an error, the upper layer transmits an ACK signal confirming receipt of the information bits. When the NACK signal is transmitted, the errored coded bits are continuously stored in the packet buffers of the combiner 718. Otherwise, when the ACK signal is transmitted, the packet buffers are initialized to store new packets to be transmitted next.

Figure 9A:
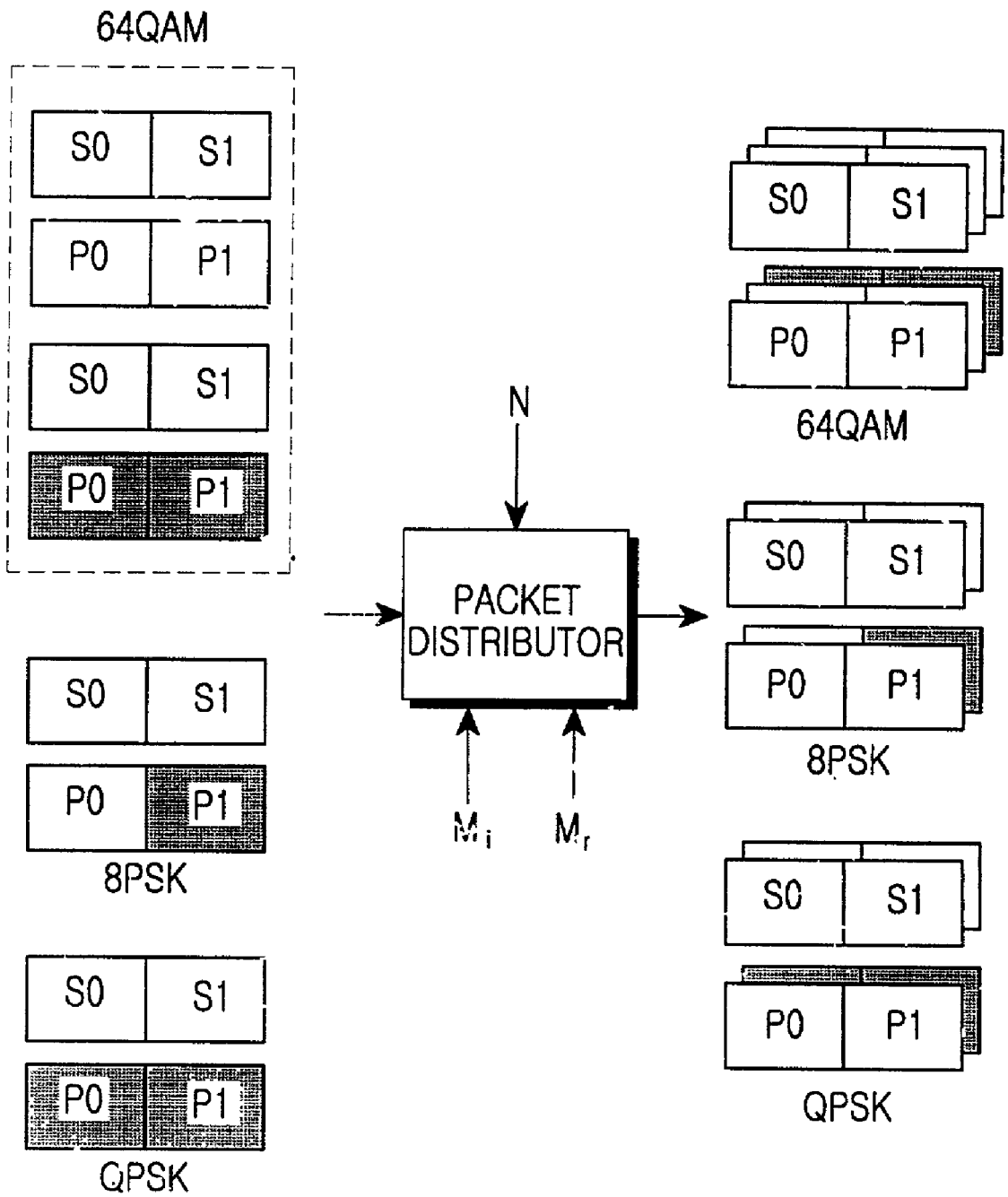
FIGS. 9A and 9B illustrate an exemplary method of distributing a received packet by the receiver upon a change in a modulation mode at retransmission, according to an embodiment of the present invention.

FIG. 9A illustrates a process of combining the packets retransmitted according to the modulation mode illustrated in FIG. 8A with the initially transmitted packets by the distributor 716 and the combiner 718 of FIG. 7. The combining process will be described with reference to FIG. 9A.

When the modulation used at retransmission has a higher order than the modulation used at initial transmission, the larger packet than the initially transmitted packet is transmitted in accordance with Equations (1) and (2), thus obtaining a sufficient combining effect over the whole packet. As illustrated in FIG. 8A, if the modulation used at retransmission is 64 QAM, two systematic packets and one parity packet are transmitted through one retransmission, thus increasing a combining gain. For reference, shaded blocks in FIGS. 8A and 9A represent non-transmitted packets.

In contrast, if the modulation used at retransmission has a lower order than the modulation used at initial transmission, a part of the initially transmitted packet is retransmitted in accordance with Equations (1) and (2). At this moment, the initially transmitted packet is selectively combined with the retransmitted systematic packet or the retransmitted parity packet. For example, in FIG. 8A, if the modulation used at retransmission is 8PSK, one systematic packet and half of the parity packet (only one sub-packet) are transmitted through one retransmission. If the modulation used at retransmission is QPSK, only one systematic packet is transmitted through one retransmission, so the combining is partially performed on the whole of the initially transmitted packet. However, since the combining can be performed on the whole systematic packet, it is possible to have the effect of combining all of the information bits in the light of the characteristic of the turbo code. As a result, the overall performance of the channel decoder is improved, resulting in a decrease in the frame error rate.

2. Second Embodiment (with a Coding Rate 3/4)

Unlike when the coding rate is 1/2, if the coding rate is 3/4, the systematic bits among the coded bits from the channel encoder 612 are 3 times larger in number than the parity bits. This means that the number of the coded bits provided to the first interleaver 616 is 3 times larger than the number of the coded bits provided to the second interleaver 618. For better understanding, reference will be made to FIG. 8B. Like where the coding rate is 1/2, 16 QAM modulation is used at initial transmission, and if the modulation mode is changed to 64 QAM, 8PSK, and QPSK at retransmission, the systematic packet is divided into sub-packets S0, S1, and S2 having the same size, for the sake of convenience, in order to show a unit of the transmitted packet.

The transmitter and the receiver according to the second embodiment of the present invention have the same functions as described in conjunction with the first embodiment with the coding rate 1/2, so a detailed description of the transmitter and the receiver will not be provided. Herein, a detailed description will be made as to the packet selector 620 of FIG. 6, and the distributor 716 and the combiner 718 of FIG. 7.

The packet selector 620 selects a data packet to be transmitted at retransmission according to control information on the modulation mode used at initial transmission, the current modulation mode and the number of retransmissions. The number of coded bits to be transmitted at retransmission is determined in accordance with Equations (1) and (2) in the same manner. That is, the sizes of the retransmission packets for the 64 QAM, 8PSK, and QPSK are 3/2, 3/4, and 1/2 times the size of the packet initially transmitted packet, respectively. By way of example, FIG. 8B illustrated combinations of retransmission packets selected by the packet selector 620, and in addition, the following combinations can also be expected.

64 QAM: (S0, S1, S2, S0, S1, P) or (S0, S1, S2, S1, S2, P) or (S0, S1, S2, S0, S1, P, P)
    8PSK: (S0, S1, S2) or (P, P, P)
    QPSK: (S0, S1) or (S1, S2) or (P, P)

In addition, the packet selector 620 may select the packets comprised of only the systematic bits or the parity bits in the form of other combinations. Like in the case where the coding rate is 1/2, a packet selection pattern can be previously sequentially determined according to the modulation modes and the number of retransmissions. Alternatively, the packets can be transmitted in a consistent combination. The receiver should also recognize the previously determined packet selection pattern. The distributor 716 and the combiner 718 can properly operate according to the packet selection pattern.

However, as illustrated in FIG. 8B, if the coding rate used is an asymmetric coding rate 3/4, it is not possible to select the whole systematic packet according to a change in the modulation mode and retransmit the selected packet, resulting in a decrease in performance of the frame error rate compared with the first embodiment with the coding rate 1/2. In this case, there is a high probability that the receiver will send a retransmission request again. Further, at retransmission, the receiver can have the effect of combining the entire initially transmitted packet by changing the retransmission packet combinations given above. As a result, the receiver can perform at least one combining on the entire initially transmitted packet, through two retransmissions.

Figure 9B:
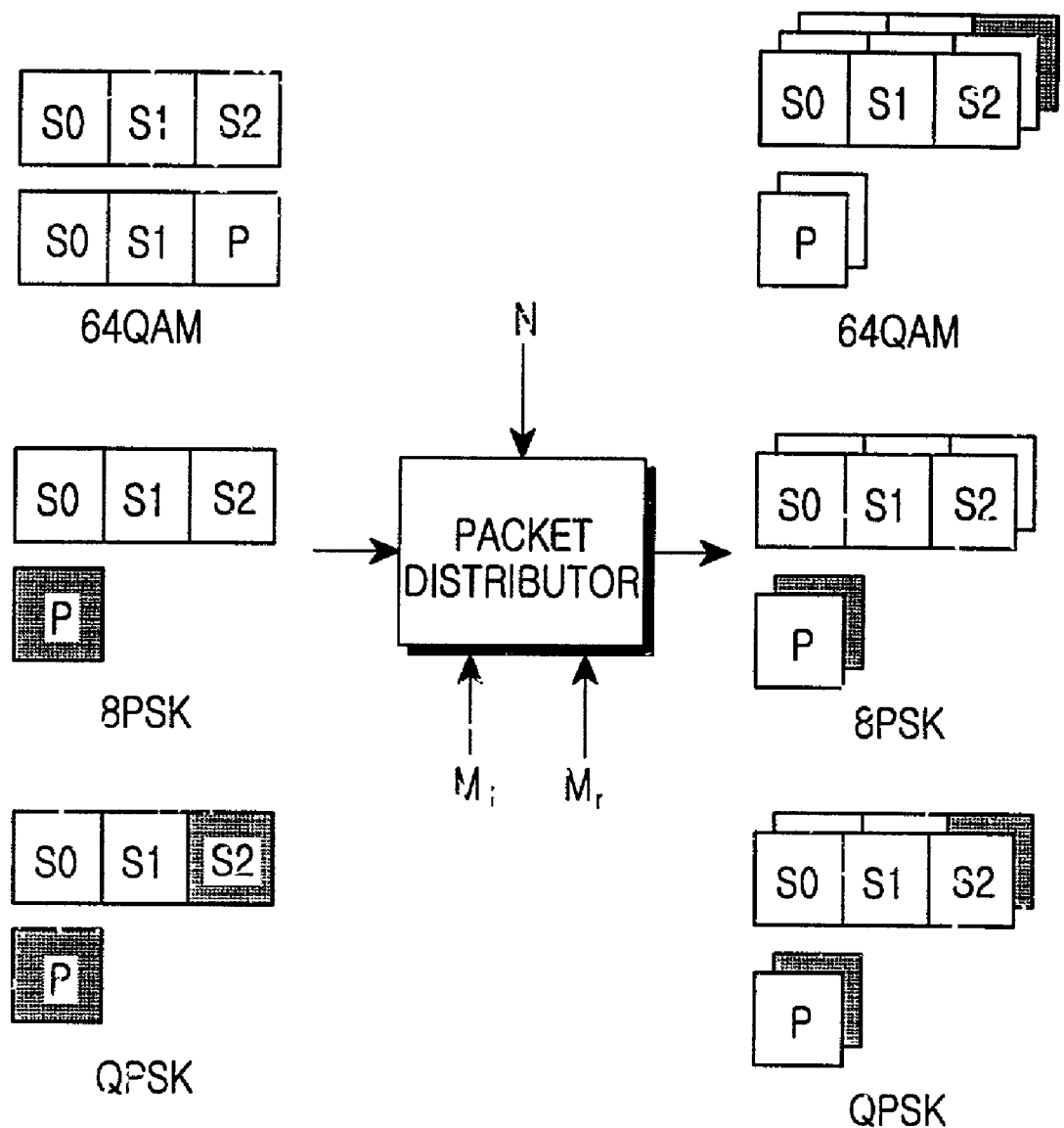

FIG. 9B illustrates a process of distributing a selected packet retransmitted according to the modulation mode of FIG. 8B to the corresponding buffers of the combiner 718 by the distributor 716 and combining an initially transmitted packet stored in the buffers of the combiner 718 with the previously retransmitted packet by the combiner 718, at a coding rate of 3/4. For example, if 64 QAM modulation is used at retransmission, it is possible to obtain a sufficient combining effect with the initially transmitted packet through one retransmission. If 8PSK modulation is used at retransmission, it is possible to obtain a combining effect on the systematic packet through one retransmission. However, if QPSK modulation is used at retransmission, it is possible to obtain a partial combining effect on 2/3 of the whole systematic packet. In this case, therefore, it is possible to obtain the combining effect on all of the systematic packet and the parity packet through one more retransmission. FIG. 9B illustrates exemplary packet combinations in which the systematic packets are first considered. This is because if the systematic bits are first compensated, the coded bits input to the channel decoder increase in reliability.

In the embodiments of the present invention, the packet selector can select the systematic packet and the parity packet in a sub-packet unit or a packet unit. In addition, the combiner can also perform combining on the received systematic packet and parity packet in a sub-packet unit or a packet unit.

As described above, the present invention increases reliability of the LLR values for the input bits to the turbo decoder by selectively transmitting the packet with higher priority in a high-speed ratio packet data communication system which is required to retransmit only a part of the initially transmitted packet due to a change in modulations according to the channel condition during retransmission. Therefore, compared with the existing system, the present invention can obtain superior transmission efficiency by decreasing the frame error rate. In addition, the present invention can be applied to not only the existing wire/wireless transceiver, but also the HSDPA and 1xEV-DV system proposed by the 3GPP and 3GPP2 standardization committee, thus increasing the overall system performance.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for data transmission in a mobile communication system, the method comprising the steps of:
    determining a modulation mode among a plurality of modulation modes;
    distributing coded bits into systematic bits and parity bits;
    if the determined modulation mode is different from a modulation mode at initial transmission, selecting coded bits to transmit among the systematic bits and the parity bits at the initial transmission in response to the determined modulation mode,
    modulating the selected coded bits into modulation symbols according to the determined modulation mode; and
    transmitting the modulated symbols.

2. The method of claim 1, wherein the determined modulation mode is determined according to a variation in a channel environment.

3. The method of claim 1, wherein the systematic bits are first selected.

4. The method of claim 1, wherein previously non-retransmitted systematic bits or previously non-retransmitted parity bits among the systematic bits and the parity bits are first selected.

5. The method of claim 1, wherein the systematic bits are first repeatedly selected along with the systematic bits and the parity bits.

6. The method of claim 1, wherein previously non-retransmitted systematic bits or previously non-retransmitted parity bits are first repeatedly selected along with the systematic bits and the parity bits.

7. The method of claim 1, wherein the systematic bits are separated into a plurality of systematic sub-packets and the parity bits are separated into a plurality of parity sub-packets, in order to select the coded bits in a unit of the systematic sub-packet or the parity sub-packet.

8. An apparatus for data transmission in a mobile communication system; the apparatus comprising:
    a controller for determining a modulation mode among a plurality of modulation modes;
    a distributor for distributing coded bits into systematic bits and parity bits;
    a selector for selecting coded bits to transmit by the determined modulation mode among the systematic bits and the parity bits at the initial transmission, if the determined modulation mode is different from the modulation mode at initial transmission; and
    a modulator for modulating the selected coded bits into modulated symbols according to the determined modulation mode.

9. The apparatus of claim 8, wherein the determined modulation mode is determined according to a variation in a channel environment.

10. The apparatus of claim 8, wherein the selector first selects the systematic bits.

11. The apparatus of claim 8, wherein the selector first selects previously non-retransmitted systematic bits or previously non-retransmitted parity bits among the systematic bits and the parity bits.

12. The apparatus of claim 8, wherein the selector first repeatedly selects the systematic bits along with the systematic bits and the parity bits.

13. The apparatus of claim 8, wherein the selector first repeatedly selects previously non-retransmitted systematic bits or previously non-retransmitted parity bits along with the systematic bits and the parity bits.

14. The apparatus of claim 8, wherein the selector separates the systematic bits into a plurality of systematic sub-packets, separates the parity bits into a plurality of parity sub-packets, and selects the coded bits in a unit of the systematic sub-packet or the parity sub-packet.

15. A method for receiving transmission data in a mobile communication system, the method comprising the steps of:
   receiving modulation mode information;
   demodulating modulated symbols according to a demodulation mode corresponding to the modulation mode information and outputting coded bits;
   distributing the coded bits into systematic bits and parity bits;
   combining the systematic bits with previously received systematic bits, and combining the parity bits with previously received parity bits; and
   decoding the combined systematic bits and the combined parity bits into information bits.

16. The method of claim 15, wherein the modulation mode to be used at retransmission is determined according to a variation in a channel environment.

17. The method of claim 15, wherein initially transmitted systematic bits are first selected.

18. The method of claim 15, wherein previously non-retransmitted systematic bits or previously non-retransmitted parity bits among initially transmitted systematic bits and initially transmitted parity bits are first selected.

19. The method of claim 15, wherein the systematic bits are first repeatedly selected along with initially transmitted systematic bits and initially transmitted parity bits as transmittable coded bits.

20. The method of claim 15, wherein previously non-retransmitted systematic bits or previously non-retransmitted parity bits are first repeatedly selected along with initially transmitted systematic bits and initially transmitted parity bits as transmittable coded bits.

21. The method of claim 15, wherein the systematic bits are a part of systematic packets and the systematic packets each are comprised of a plurality of systematic sub-packets and the parity bits are a part of the parity packets and the parity packets each are comprised of a plurality of parity sub-packets.

22. An apparatus for receiving retransmission data in a mobile communication system, the apparatus comprising:
   a demodulator for demodulating modulated symbols according to a demodulation mode and outputting coded bits;
   a distributor for distributing the coded bits into systematic bits;
   a combiner for combining the systematic bits with previously received systematic bits, and combining the parity bits with previously received parity bits; and
   a decoder for decoding the combined systematic bits and the combined parity bits into information bits.

23. The apparatus of claim 22, wherein the modulation mode to be used at retransmission is determined according to a variation in a channel environment.

24. The apparatus of claim 22, wherein initially transmitted systematic bits are first selected as retransmitted coded bits.

25. The apparatus of claim 22, wherein previously non-retransmitted systematic bits or previously non-retransmitted parity bits among initially transmitted systematic bits and initially transmitted parity bits are first selected as transmittable coded bits.

26. The apparatus of claim 22, wherein the systematic bits are first repeatedly selected along with initially transmitted systematic bits and initially transmitted parity bits as transmittable coded bits.

27. The apparatus of claim 22, wherein previously non-retransmitted systematic bits or previously non-retransmitted parity bits are first repeatedly selected along with initially transmitted systematic bits and initially transmitted parity bits as transmittable coded bits.

28. The apparatus of claim 22, wherein the systematic bits are a part of systematic packets and the systematic packets each are comprised of a plurality of systematic sub-packets and the parity bits are a part of parity packets and the parity packets each are comprised of a plurality of parity sub-packets.

29. The method of claim 15, wherein the selection of systematic bits or parity bits is performed by a packet unit.

30. The apparatus of claim 22, wherein the combining of systematic bits or parity bits is performed by a packet unit.

* * * * *